US011714955B2

(12) United States Patent
Nocedal et al.

(10) Patent No.: US 11,714,955 B2
(45) Date of Patent: Aug. 1, 2023

(54) DYNAMIC DOCUMENT ANNOTATIONS

(71) Applicant: MicroStrategy Incorporated, Vienna, VA (US)

(72) Inventors: Jose Nocedal, Leesburg, VA (US); Jiande Yu, McLean, VA (US); Raul de Leon, Vienna, VA (US); Hunter Edward Harris, Falls Church, VA (US)

(73) Assignee: MicroStrategy Incorporated, Vienna, VA (US)

( * ) Notice: Subject to any disclaimer, the term of this patent is extended or adjusted under 35 U.S.C. 154(b) by 247 days.

(21) Appl. No.: 16/723,413

(22) Filed: Dec. 20, 2019

(65) Prior Publication Data

US 2020/0134255 A1    Apr. 30, 2020

Related U.S. Application Data

(63) Continuation-in-part of application No. 16/247,892, filed on Jan. 15, 2019, now Pat. No. 11,500,655.
(Continued)

(51) Int. Cl.
*G06F 40/169*  (2020.01)
*G06F 40/14*   (2020.01)
*G06F 40/106*  (2020.01)

(52) U.S. Cl.
CPC .......... *G06F 40/14* (2020.01); *G06F 40/106* (2020.01); *G06F 40/169* (2020.01)

(58) Field of Classification Search
CPC ...... G06F 40/14; G06F 40/169; G06F 40/106; G06F 3/00; G06F 17/24; G06F 40/143; G06F 40/216; G06F 40/284
See application file for complete search history.

(56) References Cited

U.S. PATENT DOCUMENTS 6,006,242 A   12/1999  Poole et al.
6,209,005 B1   3/2001  Harker et al.
(Continued)

FOREIGN PATENT DOCUMENTS

GB    2354851    4/2001

OTHER PUBLICATIONS

U.S. Office Action in U.S. Appl. No. 16/730,417. dated Aug. 4, 2020, 22 pages.
(Continued)

*Primary Examiner* — Jennifer N Welch
*Assistant Examiner* — K C Chen
(74) *Attorney, Agent, or Firm* — Fish & Richardson P.C.

(57) ABSTRACT

Methods, systems, and apparatus, including computer programs encoded on computer-storage media, for dynamic document annotations. In some implementations, a keyword is identified in a first view of a document, the first view being provided on a user interface. An annotation for the keyword is provided for display at a first location with the first view provided on the user interface. An adjustment to the first view is detected that causes a second view of the document on the user interface, where a position of the keyword in the second view is different from a position of the keyword in the first view. In response to detecting the adjustment to the first view, the annotation is hidden from the user interface, and, after hiding the annotation, the annotation for the keyword is provided for display at a second location with the second view of the document.

23 Claims, 8 Drawing Sheets

Related U.S. Application Data

(60) Provisional application No. 62/720,955, filed on Aug. 22, 2018.

(56) References Cited

U.S. PATENT DOCUMENTS

| | | | |
|---|---|---|---|
| 6,584,479 B2 | 6/2003 | Chang et al. | |
| 7,630,965 B1 | 12/2009 | Erickson et al. | |
| 7,673,282 B2 | 3/2010 | Amaru et al. | |
| 7,747,648 B1 | 6/2010 | Kraft et al. | |
| 7,827,527 B1 | 11/2010 | Chiluvuri | |
| 8,413,045 B2 | 4/2013 | Lemonik et al. | |
| 8,539,336 B2 | 9/2013 | Griffiths et al. | |
| 8,620,083 B2 | 12/2013 | King et al. | |
| 8,761,463 B2 | 6/2014 | Cheswick | |
| 8,782,552 B2 | 7/2014 | Batrnan et al. | |
| 8,868,637 B2 | 10/2014 | Rosenstein et al. | |
| 9,070,182 B1 | 6/2015 | Chua et al. | |
| 9,165,406 B1 | 10/2015 | Gray et al. | |
| 9,317,492 B2 | 4/2016 | Ye et al. | |
| 9,412,208 B2 | 8/2016 | Greenberg et al. | |
| 9,582,154 B2 | 2/2017 | Greenberg et al. | |
| 9,582,913 B1 | 2/2017 | Kraft et al. | |
| 9,710,123 B1 | 7/2017 | Gray | |
| 10,051,107 B1 | 8/2018 | Prasad et al. | |
| 10,318,995 B2 | 6/2019 | King et al. | |
| 10,503,821 B2 | 12/2019 | Brunswig et al. | |
| 10,554,590 B2 | 2/2020 | Cabrera-Cordon et al. | |
| 10,691,314 B1 | 6/2020 | Freeman et al. | |
| 10,848,482 B1 | 11/2020 | Eisen et al. | |
| 10,885,099 B1 | 1/2021 | Price et al. | |
| 10,915,455 B2 | 2/2021 | Jayaraman et al. | |
| 11,003,323 B1 | 4/2021 | Fan et al. | |
| 11,120,057 B1 | 9/2021 | McNabney et al. | |
| 11,138,518 B1 | 10/2021 | Yu et al. | |
| 11,176,139 B2 | 11/2021 | Li et al. | |
| 11,194,717 B2 | 12/2021 | Soini et al. | |
| 11,238,210 B2 | 2/2022 | Ziraknejad et al. | |
| 11,288,637 B2 | 3/2022 | Pena et al. | |
| 11,460,976 B2 | 10/2022 | Fan et al. | |
| 11,494,372 B2 | 11/2022 | Rigney et al. | |
| 11,500,655 B2 | 11/2022 | Ziraknejad et al. | |
| 11,501,016 B1 | 11/2022 | Peterson et al. | |
| 11,501,736 B2 | 11/2022 | Notani et al. | |
| 2002/0052861 A1 | 5/2002 | Gustman | |
| 2002/0160805 A1 | 10/2002 | Laitinen et al. | |
| 2004/0080532 A1* | 4/2004 | Cragun | G06F 16/34 707/E17.093 |
| 2004/0168171 A1 | 8/2004 | Comparato et al. | |
| 2004/0172616 A1 | 9/2004 | Rothschiller et al. | |
| 2004/0230447 A1 | 11/2004 | Schwerin-Wenzel et al. | |
| 2004/0249659 A1 | 12/2004 | Schwerin-Wenzel et al. | |
| 2006/0047646 A1* | 3/2006 | Maluf | G06F 16/8358 |
| 2006/0065707 A1 | 3/2006 | Kanatani et al. | |
| 2006/0293904 A1 | 12/2006 | Ramanathan et al. | |
| 2007/0040813 A1 | 2/2007 | Kushler et al. | |
| 2007/0057037 A1 | 3/2007 | Woronec | |
| 2007/0157076 A1* | 7/2007 | Lin | G06F 40/171 715/231 |
| 2007/0174350 A1 | 7/2007 | Pell et al. | |
| 2007/0174761 A1* | 7/2007 | Lin | G06F 40/169 715/205 |
| 2007/0180377 A1 | 8/2007 | Gittelman et al. | |
| 2007/0271376 A1 | 11/2007 | Yach | |
| 2007/0280179 A1 | 12/2007 | Van Belle et al. | |
| 2008/0005659 A1* | 1/2008 | Fujimaki | G06F 16/951 707/E17.108 |
| 2008/0086455 A1 | 4/2008 | Meisels et al. | |
| 2008/0086700 A1 | 4/2008 | Rodriguez et al. | |
| 2008/0104052 A1 | 5/2008 | Ryan et al. | |
| 2008/0104501 A1 | 5/2008 | Sattler et al. | |
| 2008/0195659 A1 | 8/2008 | Rawle | |
| 2008/0209329 A1 | 8/2008 | DeFranco et al. | |
| 2008/0243834 A1 | 10/2008 | Rieman et al. | |
| 2008/0258881 A1 | 10/2008 | Manson et al. | |
| 2008/0294624 A1 | 11/2008 | Kanigsberg et al. | |
| 2009/0158200 A1 | 6/2009 | Palahnuk et al. | |
| 2009/0164564 A1 | 6/2009 | Willis | |
| 2009/0221268 A1 | 9/2009 | Yach | |
| 2009/0300051 A1* | 12/2009 | Adams | G06F 16/9562 |
| 2010/0017478 A1 | 1/2010 | Mejia et al. | |
| 2010/0095240 A1 | 4/2010 | Shiplacoff et al. | |
| 2010/0138271 A1 | 6/2010 | Henkin et al. | |
| 2010/0174998 A1 | 7/2010 | Lazarus et al. | |
| 2010/0176194 A1 | 7/2010 | Hodgkinson et al. | |
| 2010/0228624 A1 | 9/2010 | Morris et al. | |
| 2010/0278453 A1 | 11/2010 | King | |
| 2011/0026778 A1 | 2/2011 | Ye | |
| 2011/0033036 A1 | 2/2011 | Edwards et al. | |
| 2011/0055250 A1 | 3/2011 | Nandy et al. | |
| 2011/0119165 A1 | 5/2011 | Zee | |
| 2011/0196851 A1 | 8/2011 | Vadlamani et al. | |
| 2011/0246880 A1 | 10/2011 | Horton et al. | |
| 2012/0054211 A1 | 3/2012 | Arsenault et al. | |
| 2012/0084340 A1 | 4/2012 | McCormack et al. | |
| 2012/0131451 A1 | 5/2012 | Abe | |
| 2012/0144286 A1 | 6/2012 | Bank et al. | |
| 2012/0203753 A1 | 8/2012 | Biran et al. | |
| 2012/0212337 A1 | 8/2012 | Montyne et al. | |
| 2012/0233256 A1 | 9/2012 | Shaham et al. | |
| 2012/0254369 A1* | 10/2012 | Gillard | G06T 7/254 709/219 |
| 2012/0265779 A1 | 10/2012 | Hsu et al. | |
| 2012/0278164 A1 | 11/2012 | Spivack | |
| 2012/0278305 A1 | 11/2012 | Wei et al. | |
| 2013/0031453 A1* | 1/2013 | Griffiths | G06F 40/143 715/230 |
| 2013/0031454 A1 | 1/2013 | Griffiths et al. | |
| 2013/0031457 A1 | 1/2013 | Griffiths et al. | |
| 2013/0046544 A1 | 2/2013 | Kay et al. | |
| 2013/0054617 A1 | 2/2013 | Colman | |
| 2013/0117287 A1 | 5/2013 | Jagota et al. | |
| 2013/0117653 A1 | 5/2013 | Sukhanov et al. | |
| 2013/0159848 A1 | 6/2013 | Banke et al. | |
| 2013/0179209 A1 | 7/2013 | Milosevich | |
| 2013/0275120 A1 | 10/2013 | DeGross | |
| 2013/0283194 A1 | 10/2013 | Kopp et al. | |
| 2013/0325839 A1 | 12/2013 | Goddard et al. | |
| 2013/0332962 A1 | 12/2013 | Moritz et al. | |
| 2013/0344468 A1 | 12/2013 | Lindsay et al. | |
| 2014/0046976 A1 | 2/2014 | Zhang et al. | |
| 2014/0115070 A1 | 4/2014 | Virtanen et al. | |
| 2014/0115456 A1 | 4/2014 | White et al. | |
| 2014/0122289 A1 | 5/2014 | Beck | |
| 2014/0143202 A1 | 5/2014 | Rekula et al. | |
| 2014/0149896 A1 | 5/2014 | Los et al. | |
| 2014/0172418 A1 | 6/2014 | Puppin | |
| 2014/0173501 A1 | 6/2014 | Wu | |
| 2014/0177819 A1 | 6/2014 | Vymenets et al. | |
| 2014/0218385 A1 | 8/2014 | Carmi | |
| 2014/0229462 A1 | 8/2014 | Lo | |
| 2014/0236978 A1 | 8/2014 | King et al. | |
| 2014/0278349 A1 | 9/2014 | Grieves et al. | |
| 2014/0304103 A1 | 10/2014 | Barton et al. | |
| 2014/0304365 A1 | 10/2014 | Khanna | |
| 2014/0334721 A1 | 11/2014 | Cervin et al. | |
| 2014/0365395 A1 | 12/2014 | Arguelles et al. | |
| 2014/0365944 A1 | 12/2014 | Moore et al. | |
| 2015/0006564 A1 | 1/2015 | Tomkins et al. | |
| 2015/0012279 A1 | 1/2015 | Kim et al. | |
| 2015/0019221 A1 | 1/2015 | Lee et al. | |
| 2015/0074138 A1 | 3/2015 | Nam et al. | |
| 2015/0082219 A1 | 3/2015 | Beck et al. | |
| 2015/0085146 A1 | 3/2015 | Khemkar | |
| 2015/0160806 A1 | 6/2015 | Fey et al. | |
| 2015/0180875 A1 | 6/2015 | Kay | |
| 2015/0189347 A1 | 7/2015 | Oztaskent et al. | |
| 2015/0213074 A1 | 7/2015 | Varakin et al. | |
| 2015/0356085 A1 | 12/2015 | Panda et al. | |
| 2015/0381701 A1 | 12/2015 | Reddy et al. | |
| 2016/0044132 A1 | 2/2016 | Croft | |
| 2016/0048698 A1 | 2/2016 | Sahu et al. | |
| 2016/0070686 A1* | 3/2016 | Yu | G06F 16/958 715/230 |

(56) References Cited

U.S. PATENT DOCUMENTS

| | | | |
|---|---|---|---|
| 2016/0103883 A1 | 4/2016 | Ramani et al. | |
| 2016/0104200 A1 | 4/2016 | Osotio et al. | |
| 2016/0117593 A1 | 4/2016 | London | |
| 2016/0117782 A1 | 4/2016 | Stibel et al. | |
| 2016/0124924 A1 | 5/2016 | Greenberg et al. | |
| 2016/0124928 A1* | 5/2016 | Fink | G06F 40/169 715/231 |
| 2016/0170981 A1 | 6/2016 | Morimoto et al. | |
| 2016/0261658 A1 | 9/2016 | Taylor et al. | |
| 2016/0294755 A1* | 10/2016 | Prabhu | H04L 51/046 |
| 2016/0352891 A1 | 12/2016 | Niu et al. | |
| 2016/0379117 A1 | 12/2016 | Faaborg | |
| 2017/0097926 A1 | 4/2017 | Ben-Tzur | |
| 2017/0104957 A1 | 4/2017 | Farrell | |
| 2017/0109334 A1 | 4/2017 | Anglin et al. | |
| 2017/0178144 A1 | 6/2017 | Follet et al. | |
| 2017/0188213 A1 | 6/2017 | Nirantar et al. | |
| 2017/0243132 A1 | 8/2017 | Sainani et al. | |
| 2017/0308291 A1 | 10/2017 | Luipold | |
| 2017/0329466 A1 | 11/2017 | Krenkler et al. | |
| 2017/0330195 A1 | 11/2017 | Lange et al. | |
| 2017/0366579 A1 | 12/2017 | Aguiar et al. | |
| 2018/0020076 A1 | 1/2018 | Porwal | |
| 2018/0060302 A1 | 3/2018 | Liang et al. | |
| 2018/0092547 A1 | 4/2018 | Tzvieli et al. | |
| 2018/0113865 A1 | 4/2018 | Najork et al. | |
| 2018/0129941 A1 | 5/2018 | Gustafson et al. | |
| 2018/0190274 A1 | 7/2018 | Kirazci et al. | |
| 2018/0218042 A1 | 8/2018 | Krishnan et al. | |
| 2018/0225341 A1 | 8/2018 | Merg et al. | |
| 2018/0329878 A1 | 11/2018 | Hirzel et al. | |
| 2018/0337967 A1 | 11/2018 | Ritchie et al. | |
| 2018/0350144 A1 | 12/2018 | Rathod | |
| 2019/0035403 A1 | 1/2019 | Ramasamy et al. | |
| 2019/0042601 A1 | 2/2019 | Ashe | |
| 2019/0042988 A1 | 2/2019 | Brown et al. | |
| 2019/0057165 A1 | 2/2019 | Rosen et al. | |
| 2019/0073350 A1 | 3/2019 | Shiotani | |
| 2019/0080416 A1 | 3/2019 | Smith et al. | |
| 2019/0130468 A1 | 5/2019 | Lerman et al. | |
| 2019/0164063 A1 | 5/2019 | Moura et al. | |
| 2019/0197916 A1 | 6/2019 | Park | |
| 2019/0220867 A1 | 7/2019 | Karani et al. | |
| 2019/0236205 A1 | 8/2019 | Jia et al. | |
| 2019/0297186 A1 | 9/2019 | Karani | |
| 2019/0392024 A1* | 12/2019 | Singh | G06F 40/16 |
| 2020/0005117 A1 | 1/2020 | Yuan et al. | |
| 2020/0029113 A1 | 1/2020 | Dacus et al. | |
| 2020/0065122 A1 | 2/2020 | Ziraknejad et al. | |
| 2020/0065307 A1 | 2/2020 | Roy et al. | |
| 2020/0065342 A1 | 2/2020 | Panuganty | |
| 2020/0126540 A1 | 4/2020 | Panchamgam et al. | |
| 2020/0143102 A1 | 5/2020 | Ziraknejad et al. | |
| 2020/0160612 A1 | 5/2020 | Bowen et al. | |
| 2020/0186836 A1 | 6/2020 | Milanfar et al. | |
| 2020/0192965 A1 | 6/2020 | Imtiaz et al. | |
| 2020/0251111 A1 | 8/2020 | Temkin et al. | |
| 2020/0327564 A1 | 10/2020 | Simard et al. | |
| 2020/0387550 A1 | 12/2020 | Cappetta et al. | |
| 2020/0389317 A1 | 12/2020 | Dunjic et al. | |
| 2020/0395001 A1 | 12/2020 | Mohanty et al. | |
| 2020/0395016 A1 | 12/2020 | Kapila et al. | |
| 2020/0401580 A1 | 12/2020 | Fitzpatrick et al. | |
| 2020/0401593 A1 | 12/2020 | Panuganty et al. | |
| 2021/0081902 A1 | 3/2021 | Pena et al. | |
| 2021/0084032 A1 | 3/2021 | Ding et al. | |
| 2021/0133269 A1 | 5/2021 | Shah et al. | |
| 2021/0141794 A1 | 5/2021 | Picorel et al. | |
| 2021/0142763 A1 | 5/2021 | Notani et al. | |
| 2021/0149906 A1 | 5/2021 | Li et al. | |
| 2021/0201916 A1 | 7/2021 | Touret et al. | |
| 2021/0224345 A1 | 7/2021 | Shah et al. | |
| 2021/0240759 A1 | 8/2021 | Hwang et al. | |
| 2021/0240773 A1 | 8/2021 | Chen et al. | |
| 2021/0248135 A1 | 8/2021 | Rigney et al. | |
| 2021/0263916 A1 | 8/2021 | Niu et al. | |
| 2021/0271727 A1 | 9/2021 | Fan et al. | |
| 2021/0278938 A1 | 9/2021 | Fan et al. | |
| 2021/0342338 A1 | 11/2021 | Nocedal et al. | |
| 2021/0357378 A1 | 11/2021 | Urdiales et al. | |
| 2022/0222418 A1 | 7/2022 | Ziraknejad et al. | |

OTHER PUBLICATIONS

U.S. Notice of Allowance in U.S. Appl. No. 16/730,417, dated Sep. 23, 2021, 9 pages.
Constellationr.com [online], "MicroStrategy Embeds Analytics Into Any Web Interface" Feb. 12, 2019, retrieved on Jan. 15, 2020, retrieved from URL <https://www.constellationr.com/blog-news/microstrategy-embeds-analytics-any-web-interface>, 8 pages.
Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.
Developer.moziila.org [online], "High-level view," Jan. 29, 2018, retrieved on Jan. 15, 2020, retrieved from URL < https://wiki.developer.mozilla.org/en-US/docs/Web/Web_Components/Using_shadow_DOMSrevision/1352031>, 6 pages.
Forbes.com [online], "These Ex-Israeli Surveillance Agents Hijack Your Browser to Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 11 pages.
Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.
Githtib.com [online], "Textus," Oct. 27, 2012, retrieved on Jan. 15, 2020, retrieved from URL<https://github.com/okfn/textus>.
Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.
Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.
Nicolasleroy.fr [online], "TheFind launches price comparison service", Nov. 19, 2009, retrieved on May 14, 2012, retrieved from URL <http://www.nicolasleroy.fr/wp/2009/11/thefind-launches-price-comparison-service/ >, 6 pages.
Robdodson.me [online], "Shadow DOM: JavaScript," Sep. 2, 2013, retrieved Jan. 15, 2020, retreived from URL <https://robdodson.me/shadow-dom-javascript/>, 11 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.
Vibrantmedia.com [online], "FAQs: Vibrant In-Text Advertising," retrieved on Mar. 31, 2011, retrieved from URL <http://www.vibrantmedia.com/in-text_advertising/faq.asp>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017. retrieved on Jan. 15, 2020, retrieved from URL <https://en.wikipedia.org/w/

(56) References Cited

OTHER PUBLICATIONS index.php?title=Web_Components&oldid=815726999>, 5 pages.
U.S. Notice of Allowance in U.S. Appl. No. 16/788,530, dated Feb. 22, 2021, 12 pages.
U.S. Office Action in U.S. Appl. No. 16/788,530, dated Jun. 25, 2020, 21 pages.
U.S. Office Action in U.S. Appl. No. 16/247,892 dated Jul. 15, 2021, 25 pages.
U.S. Office Action in U.S. Appl. No. 16/248,659, dated Jul. 16, 2021, 17 pages.
"Screenshots Showing Example of Grammarly Web Browser Extension", Aug. 19, 2019, 2 pages.
community.microstrategy.com [online] "Amazon's Alexa: Key Analytics Applications That Deliver Voice-activated Reporting," May 2017, retrieved on May 21, 2020, retrieved from URL < https://community.microstrategy.com/s/article/Amazon-s-Alexa-Key-Analytics-Applications-That-Deliver-Voice-activated-Reporting?language=en_US>, 4 pages.
community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.
community.microstrategy.com [online], "HyperVoice and HyperVision," Feb. 2019, retrieved on May 21, 2020, retrieved from URL <https://community.microstrategy.com/s/question/0D544000073QxyCCAS/hypervoice-and-hypervision?language=en_US>.
community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.
doughenschen.com [online], "MicroStrategy Embeds Analytics Into Any Web Interface" Feb. 2019, retrieved on May 21, 2020, retrieved from UR: <https://doughenschen.com/2019/02/10/microstrategy-embeds-analytics-into-any-web-interface/>, 6 pages.
eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui.
idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.
Lippens, "Amazon's Alexa: Key Analytics Applications That Deliver VoiceActivated Reporting," May 2017, MicroStrategy, 23 pages.
Lippens, "Your Voice is Your Passport: Implementing Voice-driven Applications with Amazon Alexa," 2017, Microstrategy, 33 pages.
Lippens., "How to Implement Voice-controlled Data Analytics With Amazon's Alexa," May 2017, Microstrategy, 4 pages.
microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.
microstrategy.com [online], "Microstrategy 2019, the Platform for the Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.
microstrategy.com [online], "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation, 30 pages.
microstrategy.com, [online], "Whats New in Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.

prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.
zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>. 6 pages.
U.S. Office Action in U.S. Appl. No. 16/247,892, dated Jan. 13, 2020, 20 pages.
U.S. Office Action in U.S. Appl. No. 16/247,892, dated Jun. 4, 2020, 26 pages.
U.S. Office Action in U.S. Appl. No. 16/247,892, dated Mar. 10, 2021, 29 pages.
U.S. Office Action in U.S. Appl. No. 16/248,659, dated Dec. 17, 2020, 5 pages.
U.S. Office Action in U.S. Appl. No. 16/248,659, dated Feb. 17, 2021, 14 pages.
U.S. Office Action in U.S. Appl. No. 16/730,417, dated Feb. 11, 2021, 19 pages.
Glazkov [online], "What the Heck is Shadow DOM?," Jan. 14, 2011, retrieved on Mar. 30, 2022, retrieved from URL <https://glazkov.com/2011/01/14/what-the-heck-is-shadow-dom/>, 38 pages.
HTML 5 Rocks [online], "Shadow DOM 101," Oct. 3, 2016, retrieved on Mar. 30, 2022, retrieved from URL <https://www.html5rocks.com/en/tutorials/webcomponents/shadowdom/#toc-separation>, 10 pages.
Notice of Allowance in U.S. Appl. No. 16/247,892, dated Mar. 3, 2022, 6 pages.
Office Action in U.S. Appl. No. 16/248,659, dated Feb. 14, 2022, 19 pages.
Office Action in U.S. Appl. No. 16/783,998, dated Feb. 16, 2022, 35 pages.
Office Action in U.S. Appl. No. 16/804,575, dated Feb. 15, 2022, 12 pages.
Office Action in U.S. Appl. No. 17/316,201, dated Feb. 15, 2022, 25 pages.
Polymer Library [online], "Shadow DOM concepts," 2014-2020, retrieved on Mar. 30, 2022, retrieved from URL <https://polymer-library.polymer-project.org/2.0/docs/devguide/shadow-dom, 13 pages.
Notice of Allowance in U.S. Appl. No. 16/688,065, dated Sep. 30, 2021, 9 pages.
Notice of Allowance in U.S. Appl. No. 17/021,116, dated Jan. 20, 2022, 8 pages.
Notice of Allowance in U.S. Appl. No. 17/316,201, dated Jun. 2, 2022, 8 pages.
Office Action in U.S. Appl. No. 16/804,644, dated Apr. 22, 2021, 37 pages.
Office Action in U.S. Appl. No. 16/804,644, dated Mar. 17, 2022, 47 pages.
Office Action in U.S. Appl. No. 16/804,644, dated Oct. 28, 2021, 45 pages.
Office Action in U.S. Appl. No. 17/021,116, dated Sep. 8, 2021, 24 pages.
Office Action in U.S. Appl. No. 17/065,837, dated Feb. 11, 2022, 12 pages.
Office Action in U.S. Appl. No. 17/084,574, dated Jan. 13, 2022, 30 pages.
Office Action in U.S. Appl. No. 17/155,365, dated Mar. 28, 2022, 14 pages.
Office Action in U.S. Appl. No. 17/172,767, dated Jan. 6, 2022, 9 pages.
Office Action in U.S. Appl. No. 17/179,479, dated Apr. 8, 2022, 9 pages.
Office Action in U.S. Appl. No. 17/180,171, dated Apr. 27, 2022, 32 pages.
Notice of Allowance in U.S. Appl. No. 16/247,892, dated Jul. 7, 2022, 6 pages.
Notice of Allowance in U.S. Appl. No. 17/065,837, dated Jul. 28, 2022, 10 pages.

(56) References Cited

OTHER PUBLICATIONS

Notice of Allowance in U.S. Appl. No. 17/172,767, dated Jul. 5, 2022, 9 pages.
Notice of Allowance in U.S. Appl. No. 17/179,479, dated Sep. 27, 2022, 7 pages.
Office Action in U.S. Appl. No. 16/248,659, dated Jul. 18, 2022, 17 pages.
Office Action in U.S. Appl. No. 16/783,998, dated Sep. 20, 2022, 39 pages.
Office Action in U.S. Appl. No. 16/804,575, dated Jun. 24, 2022, 14 pages.
Office Action in U.S. Appl. No. 16/804,575, dated Oct. 6, 2022, 13 pages.
Office Action in U.S. Appl. No. 16/804,644, dated Sep. 16, 2022, 49 pages.
Office Action in U.S. Appl. No. 17/084,574, dated Aug. 19, 2022, 38 pages.
Office Action in U.S. Appl. No. 17/155,365, dated Sep. 27, 2022, 18 pages.
Office Action in U.S. Appl. No. 17/180,171, dated Jul. 29, 2022, 40 pages.
Office Action in U.S. Appl. No. 16/248,659, dated Dec. 22, 2022, 20 pages.
Office Action in U.S. Appl. No. 17/166,023, dated Jan. 3, 2023, 21 pages.
Office Action in U.S. Appl. No. 17/180,171, dated Dec. 5, 2022, 39 pages.

\* cited by examiner

FIG. 3

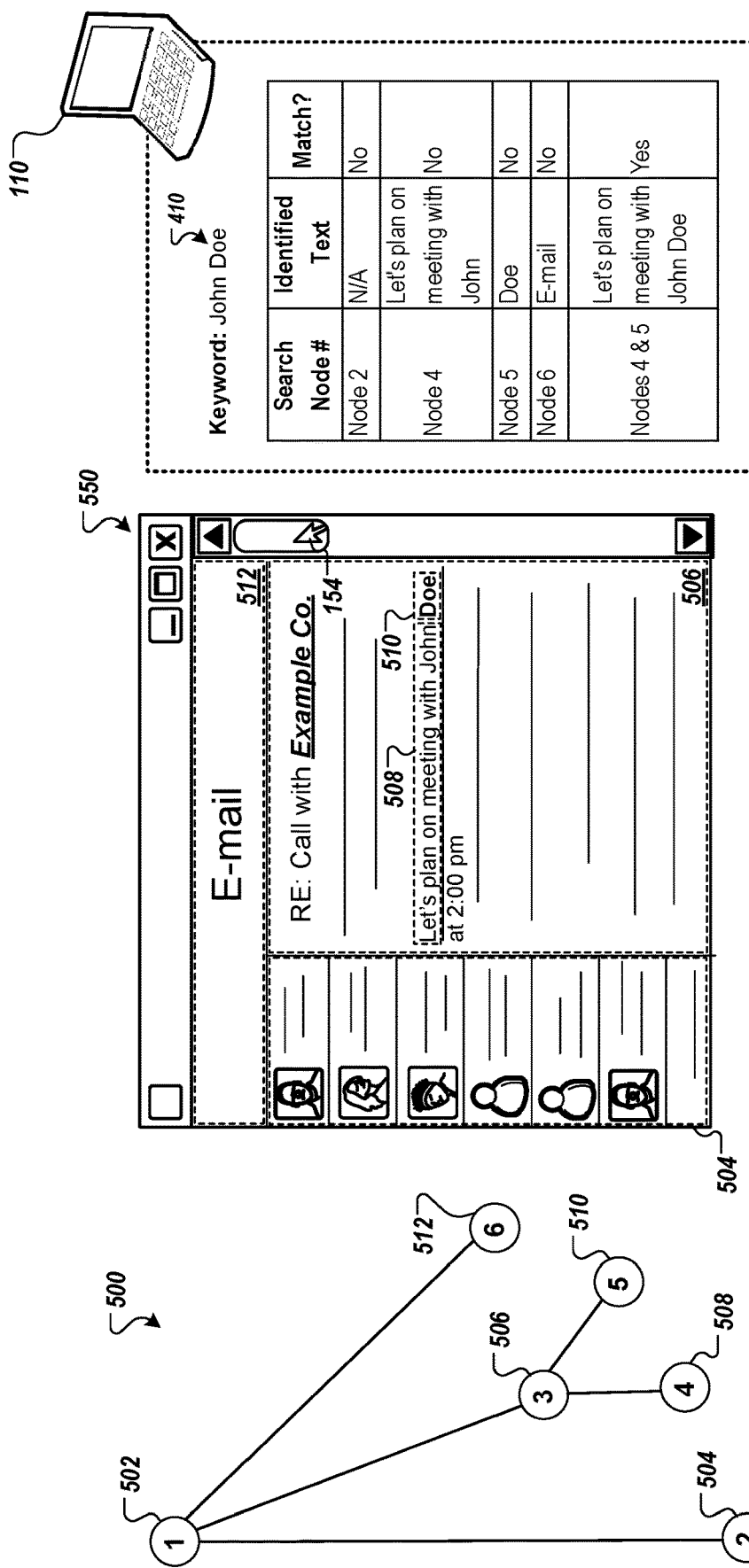

DYNAMIC DOCUMENT ANNOTATIONS

CROSS-REFERENCE TO RELATED APPLICATIONS

This application is a continuation-in-part of U.S. application Ser. No. 16/247,892, filed Jan. 15, 2019, which claims the benefit of U.S. Provisional Application Ser. No. 62/720,955, filed on Aug. 22, 2018. Both of these prior applications are incorporated by reference in their entirety.

TECHNICAL FIELD

The present specification relates to web pages.

BACKGROUND

Some web browser extensions attempt to modify the HTML of a web page. However, such modifications can lead to conflicts and issues presenting the web page on many modern websites.

SUMMARY

In some implementations, a computing system can identify keywords in a user interface and dynamically generate one or more annotations to present on the user interface. For example, a client device can run a software agent, such as a web browser extension, that monitors a user interface for instances of certain keywords. When the keywords are present, the software agent generates at least one annotation and presents it on the user interface. The annotation may be, for example, an overlay of the keywords such as a highlight, though various other types of annotations are possible. The computer system may detect an adjustment to the user interface and, in response, hide the annotation. For example, a software agent running on the client device may detect a user scrolling through a web page presented on the user interface and, in response, hide or disable highlights of identified keyword(s). Once the computer system detects that the adjustment has ended, the computer system may again identify the keywords in the user interface and present the annotation on the user interface.

In some implementations, the computer system provides the annotation at a location in the user interface where the identified keyword(s) are located. For example, when the computer system first identifies a keyword, it may present an annotation at the location of the keyword. After, the user interface is adjusted and the location of the keyword changes due to the adjustment, the computer system may provide the annotation at the keyword's new location.

In some implementations, the computer system places the generated annotations into the shadow document object model (DOM). By placing the annotations in the shadow DOM, the computer system can prevent interference between a web page and the annotations. For example, this arrangement can prevent the changes that a web page makes to its own content (e.g., dynamic changes or additions to the web page) from altering or interfering with the annotations that have been placed in the shadow DOM. Similarly, the arrangement prevents the annotations or other added content from interfering with the structure of the web page (e.g., as defined in HTML or other content of the web page). For example, the computer system can generate a shadow DOM node for an overlay to be displayed along with (e.g., visually covering or over the main page content) instead of, for example, directly modifying the existing web page's content. The added DOM node(s) for annotations are thus added to the DOM (e.g., the shadow DOM or the end of the DOM) in a manner that does not disrupt the web page's formatting. If the web page alters its structure, e.g., through inserting new content, the web page's DOM elements are arranged as the web page expects.

In some implementations, the computer system identifies keywords in a user interface by traversing the DOM tree of the web page presented in the user interface. In traversing the DOM tree, the computer system may search each section or node of the DOM tree. If the computer system finds a partial match of a keyword in a given node, e.g., the computer system finds a match for one word of a keyword having two words, the computer system may search the parent node and/or each of the parent node's other child nodes for the remaining portion of the keyword. In this way, the computer system can identify keywords in a given webpage even when different parts of the keywords are formatted differently.

In some implementations, the computer system makes the annotations interactive in the user interface. For example, if a user interacts with the annotation by placing a cursor over the annotation, the software agent causes an information card or information panel to be displayed, e.g., overlaying a portion of the original user interface or otherwise inserted into the user interface. In this manner, the user can easily access information that is contextually relevant to the user interface, without the need to open a new application or switch between interfaces. This technique also provides numerous other advantages, discussed below, such as allowing content to be efficiently integrated with third-party user interfaces that the content provider does not control.

In one general aspect, a method performed by one or more computers includes: identifying a keyword in a first view of a document, the first view being provided on a user interface; providing an annotation for the keyword for display at a first location with the first view provided on the user interface; detecting an adjustment to the first view that causes a second view of the document on the user interface, where a position of the keyword in the second view is different from a position of the keyword in the first view; and in response to detecting the adjustment to the first view: hiding the annotation from the user interface; and after hiding the annotation, providing the annotation for the keyword for display at a second location with the second view of the document.

Implementations can include one or more of the following features. In some implementations, the method includes determining that the adjustment has ended; and in response to determining that the adjustment has ended, identifying the keyword in the second view of the document before providing the annotation for the keyword for display at the second location with the second view of the document.

In some implementations, determining that the adjustment has ended includes determining that the second view has not changed for at least a minimum threshold amount of time.

In some implementations, detecting the adjustment includes detecting at least one of a scroll of the document, a resize of the document, a zoom of the document, a page skip in the document, a selection of a link in the document, an opening of a toolbar, a refresh of the document, or a selection of a toolbar element.

In some implementations, the document is represented by a Document Object Model (DOM); and the annotation is an element in the DOM.

In some implementations, detecting the adjustment includes detecting an event that changes the DOM.

In some implementations, detecting the adjustment includes detecting a change in the DOM that alter the first view.

In some implementations, hiding of the annotation from the user interface is triggered by detecting a change in the DOM that alters the first view.

In some implementations, the method includes using the DOM to identify the first location of the keyword in the first view of the document; and using the DOM to identify the second location of the keyword in the second view of the document.

In some implementations, identifying a keyword in a first view of a document includes: searching through one or more nodes of the DOM for the keyword; and based on searching through the one or more nodes, determining that the keyword is present in a node of the one or more nodes of the DOM.

In some implementations, identifying a keyword in a first view of a document includes: searching through one or more nodes of the DOM for a first portion of the keyword; identifying the first portion of the keyword in a first node of the one or more nodes; searching at least one of a child node of the first node, a parent node of the first node, or a child node of the parent node for a second portion of the keyword; identifying the second portion of the keyword in at least one of the child node of the first node, the parent node of the first node, or the child node of the parent node; and based on identifying the first portion of the keyword and the second portion of the keyword, determining that the keyword is present in the DOM.

In some implementations, the annotation includes at least one of an overlay, a border, an underline, a border, a strikethrough, an overline, a change to text font, a change to text size, capitalization of text, a removal of text capitalization, a change to letter spacing in text, an emboldening of text, or an italicization of text.

In some implementations, hiding the annotation from the user interface includes removing an element corresponding to the annotation from a DOM for the document.

In some implementations, hiding the annotation from the user interface includes altering an annotation element in a DOM for the document to make the annotation invisible.

In some implementations, hiding the annotation from the user interface includes disabling the annotation.

In some implementations, providing the annotation for the keyword for display at the first location includes causing the annotation for the keyword to be displayed at a first position on a screen; and where providing the annotation for the keyword for display at the second location with the second view of the document includes causing the annotation for the keyword to be displayed at a second position on the screen.

In some implementations, causing the annotation for the keyword to be displayed at a first position on a screen includes causing the annotation for the keyword to be displayed at a first pixel location on the screen; and where causing the annotation for the keyword to be displayed at a second position on the screen includes causing the annotation for the keyword to be displayed at a second pixel location on the screen.

In some implementations, hiding the annotation from the user interface includes hiding the annotation from the user interface as the first view transitions to the second view.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a diagram illustrating an example of a user interface showing an information card provided in response to user interaction.

FIGS. 5A-5C are diagrams pertaining to a document object model tree of a document.

Like reference numbers and designations in the various drawings indicate like elements.

DETAILED DESCRIPTION

Figure 1:
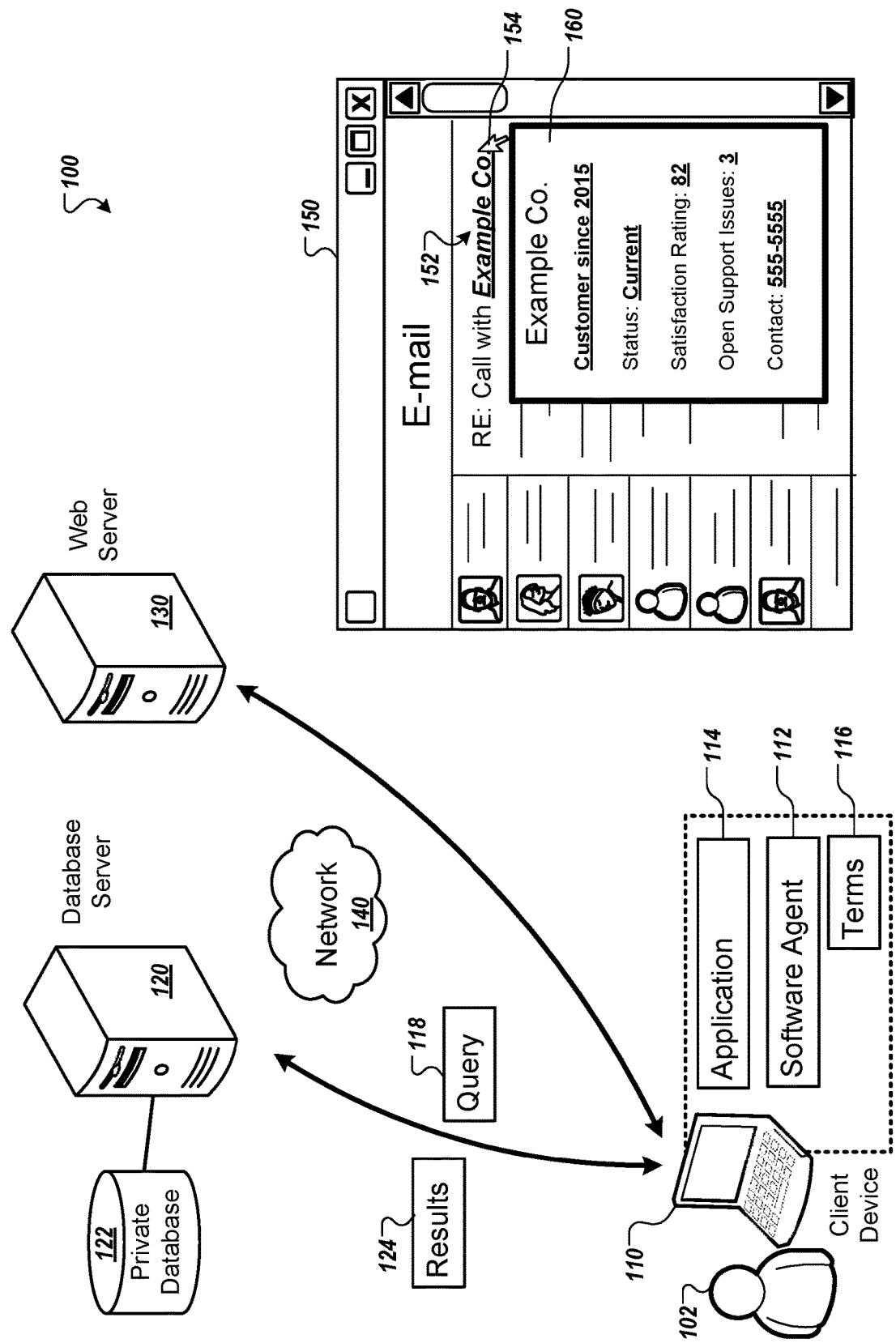
FIG. 1 is a diagram of an example of a system for inline delivery of database content.

A computing system can identify keywords in a user interface and dynamically generate one or more annotations for a document to present on the user interface. The annotations may include, for example, an overlay of the keywords such as a highlight or a formatting change to the keywords such as italicizing them. When the computer system detects an adjustment to the user interface such as a scroll, a zoom, a window resize, or an opening of a toolbar, the computer system will hide or disable the annotation(s). The computer system may keep the annotation(s) hidden or disabled until it determines that the adjustment to the user interface has ended. When the computer system determines that the adjustment to the user interface has ended, the computer system may re-identify the keywords in the user interface, and enable or unhide the annotation(s) and provide the annotation(s) for display in the user interface at a new location based on the location of the identified keywords.

In some implementations, the computer system removes the annotations when it detects an adjustment to the user interface. When the computer system determines that the adjustment to the interface has ended, the computer system may perform a new search of the keywords on the user interface, and generate and present new annotations for any identified keywords.

In some implementations, the annotations are generated by a software agent running on a client device, such as a web browser extension, that monitors a user interface for instances of certain keywords.

In some implementations, the annotations are placed or are generated in the shadow DOM for a given document.

In some implementations, a computing system can identify keywords in a user interface and dynamically retrieve and present relevant information inline with the user interface. For example, a client device can run a software agent, such as a web browser extension, that monitors a user interface for instances of certain keywords. When the keywords are present, the software agent annotates the keywords and makes them interactive in the user interface. If a user interacts with a keyword, for example, by placing a cursor over the keyword, the software agent causes an information card or information panel to be displayed, e.g., overlaying a portion of the original user interface or otherwise inserted into the user interface. In this manner, the user can easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system allows for significant customizability. These keywords monitored by the software agent can be specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the software agent communicates with a server system to obtain information related to the keyword. This information can include data retrieved from a private database that has information specific to an organization associated with the user. For example, if the keyword refers to a customer of a user's company, status information, statistics, contact information, and other information about the customer's account with the company can be provided from the company's private database.

The type of information provided, as well as the values shown for those information types, can be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface. For example, one company may have content to be embedded in an application provided by a different company. The content provider would need to rely on the application provider to modify the structure of the application, one page at a time, in order to have the content embedded. For example, it is often difficult for a company to integrate content from its proprietary database into a user interface provided by a third party, e.g., an e-mail application, a word processing application, a spreadsheet application, etc., because the company generally cannot change the structure of the user interface provided by the third-party.

The challenge of embedding content in user interfaces is also significant since the embedded content may be needed only selectively. For example, it may be desirable to embed content on some pages but not others. Similarly, the embedded content may only be applicable for a page at certain times and not others. The need for the embedded content may vary over time, and may be dependent on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

The techniques discussed in this document address these challenges by allowing content to be presented inline with web pages and applications that the content provider does not control and cannot modify. Similarly, the system can be configured to provide content inline with other content that has not been created yet, such as web pages or web applications that are not yet available.

The techniques in this document also provide an efficient way for users to access information, such as analytics data, in a user interface. By allowing a user to call up an information card within existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface where the user needs the information. This provides needed information to just the right user, time, and user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, click, or tap on an annotated term in the user interface.

Limited user interface space is conserved since the information card can be provided in the same window or area of the application the user is already using, with no need to switch between applications. Also, the information card is displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator can identify columns of a private database corresponding to employee names, customer names, and product names. The system extracts the contents of these columns and designates them as key terms for the organization. The current set of these terms can be downloaded to client devices of members of the organization when they authenticate to the software agents on the client devices, so each time the user authenticates the set of terms is refreshed at the client device based on the current state of the database. The information displayed in the information cards is also generated using the current records of the database. Thus, by designating certain records or fields from an organization's database, an administrator can adjust or update the set of content published to some or all members of the organization, which will be made available through many user interfaces (e.g., presented in-line with any web page or web application).

When a client device indicates that one of the key terms for the organization is present, the server system can access the underlying database record(s) corresponding to the term to generate relevant information to provide. The semantic meaning of the term that is applicable for the user and organization is used to provide customized results. For example, different types of information are provided based on the classification of the term, e.g., whether a term is the name of an employee, customer, or product. Different semantic classifications can have different data types or sets of information to be provided. Even for a particular classification, of the many potential types of data that may be provided, a subset can be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organizations security policies are preserved. If a user does not have authorization to access a field or record from the database, the server system will enforce access restrictions and will not provide the information. Consequently, different users even within the same organization may be presented different sets of information for the same term, due to the users' differing roles, interaction histories, access authorizations, and other factors.

FIG. 1 is a diagram of an example of a system 100 for inline delivery of database content. The system 100 includes a client device 110, a server 120, a web server 130, and a network 140. The server 120 has access to a private database 122 for an organization. The server 120 may be implemented using multiple computers that cooperate to perform the functions discussed below, and which may be located remotely from each other. The client device 110 includes an application 114 as well as a software agent 112 that enables the client device 110 to dynamically generate and display contextually-relevant information cards displayed inline with the application 114. As discussed below, the software agent 112 allows the client device 110 to obtain and provide information from the private database 122 with the application 114 and web page from the web server 130, even though the application 114 and web page are controlled by third parties.

The client device 110 is associated with a user 102, who is a member of an organization, e.g., an employee of a company. The private database 122 represents database records stored by or for the organization. The records are not publicly available and are subject to data access restrictions, such as requirements that users be issued credentials from the organization that grant authorization to access the records. Different users may be granted different levels of authorization, and the server 120 enforces access restrictions so that each user is only allowed to access the subsets of information the user is authorized to access.

Traditional analytics platforms generally incorporate analytics content into the body of a document, using an iFrame or similar technique. This approach can be inefficient, because each application or web page generally needs to be updated individually. Further, this type of embedding may not be possible when the content provider does not control the target application or web page for content to be embedded into. For example, an organization cannot change the standard e-mail application interface that a third party provides.

In the system 100, instead of incorporating additional content into the source of a document or application, information is instead added, just in time, through the software agent 112, for example, a browser extension for a web browser. This provides the flexibility for the system to selectively provide dynamically changing content from the private database for any interface shown on the application 114, e.g., any web application or web page displayed by a web browser.

In the example of FIG. 1, the client device 110 communicates with the web server 130 to obtain and display a page of a web site or web application in the application 114. The client device 110 generates a user interface 150 for the application 114. Concurrently, the software agent 112 runs on the client device 110 and receives, from the application 114, the text content of the rendered page, e.g., user interface 150.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been granted to the user 102 by the organization.

With the user logged in, the software agent 112 accesses a set of terms 116, e.g., words and/or phrases, that are relevant to the user 102 and the organization. The set of terms 116 stored at the client device 110. In some implementations, the set of terms 116 is requested and received from the server 120 each time the user 102 authenticates. The set of terms can represent values from certain fields of the private database 122, for example, values representing names of customers of the company of the user 102.

The software agent 112 compares the terms 116 with the text of the user interface 150 to identify matching terms. When the software agent 112 identifies one or more matches, it generates a query 118 that indicates the matches and sends the query 118 to the server 120. In some implementations, the software agent 112 also examines the text of the user interface 150 to identify and include in the query 118 other contextual factors that may be of interest (which may be different from the terms 116 of interest), such as terms indicating a time or a geographical location indicated in the user interface 150, or a task of the user 102 that may be indicated in the user interface 150. Various words and phrases indicating an overall subject or topic of the user interface 150 may also be extracted and provided in the query 118.

The server 120 processes the query 118 and generates results 124 using the contents of the private database 122. These results 124 can indicate, for each identified matching term, various indicators (e.g., attributes, statistics, visualizations, text, or other content) relevant to the term. In some instances, the indicators can represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 receives the results 124 from the server 120. The software agent 112 annotates instances of the identified matching terms in the user interface 150 and prepares the results 124 for display. For example, to annotate the matching terms, the software agent 112 may instruct the application 114 to highlight the term or otherwise change the formatting of the term (e.g., color, font, size, bold, italics, underlining, etc.) in the user interface 150. In some implementations, the results 124 are not immediately displayed. Rather, the software agent 112 causes the matching terms to become interactive, so that interaction of the user 102 with a term triggers display of an information card 160 for that term. In this manner, when the user 102 indicates interest in one of the terms, e.g., by placing a mouse cursor over the term, the software agent 112 is notified of the interaction and causes an information card 160 with the indicators relevant to the term to be displayed. The information card 160 can be displayed overlaying a portion of the original user interface 150, for example, as a pop-up card near the instance of the term that the user 102 interacted with. The software agent 112 also detects when the user 102 is no longer interested in the information card 160 and automatically removes (e.g., closes or hides) the information card 160 in response. For example, when the user 102 moves the cursor away from the interactive term and away from the information card 160 (or taps or clicks outside the interactive term and information card), the software agent 112 hides the information card 160.

In FIG. 1, the software agent 112 has determined that the user interface 150 includes a term 152 "Example Co.," which is one of the terms 116 relevant to the organization of the user 102. The software agent 112 has received results 124 that indicate indicators for this term 152, which represents a customer of the organization of the user 102. In response to identifying the matching term 152, and in some instances also receiving results 124 from the server 120 for the matching term 152, the software agent 112 makes the term 152 interactive and causes the term 152 to be annotated, in this case, displayed bold, underlined, and in italics. Initially, the software agent 112 does not cause any of the indicators for the term 152 to be displayed. However, when the user moves the cursor 154 over the term 152, the software agent 112 detects the interaction and displays an information card 160 showing various indicators provided by the server 120 in the results 124. When the user 102 is done reviewing the information card 160, the user 102 can move the cursor away or click away from the term 152 and information card 160, and the software agent 112 automatically hides the information card 160 until the user 102 again interacts with the term 152.

The software agent 112 can receive and examine the content of the user interface 150 of the application 114 on a recurring or ongoing basis. For example, as the user 102 navigates to a new web page or a new view of a web application, the software agent 112 examines the updated content of the user interface 150. The software agent 112 finds matches in the updated interface, requests and obtains new results for the updated interface, and causes new sets of terms to be annotated and made interactive, allowing the user 102 to access information cards for key terms for whatever interface content may be provided in the application 114. The software agent 112 can receive and analyze user interface content in substantially real time. For example, if the user 102 composes an e-mail message, the software agent can detect matching terms in text that the user types, in some instances while the user is still typing, and annotate matching terms in this content.

The system can provide very low latency for users to receive information regarding key terms in a user interface. Because the software agent 112 can identify terms and obtain terms automatically and in the background, in many instances the information needed for an information card 160 is already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface 150 of the application 114.

Figure 2A:
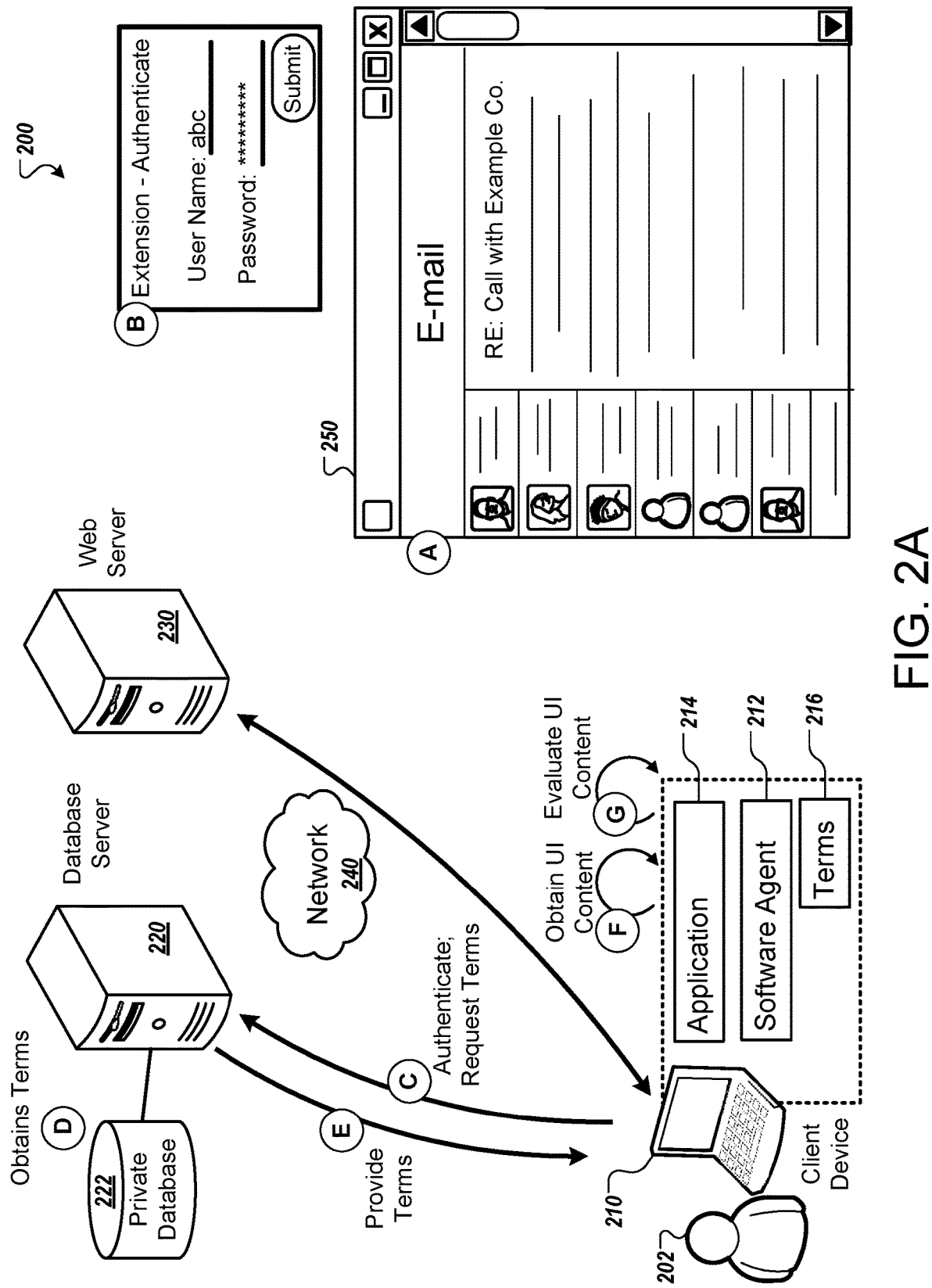
FIGS. 2A-2B are diagrams illustrating another example of a system for inline delivery of database content.
Figure 2B:
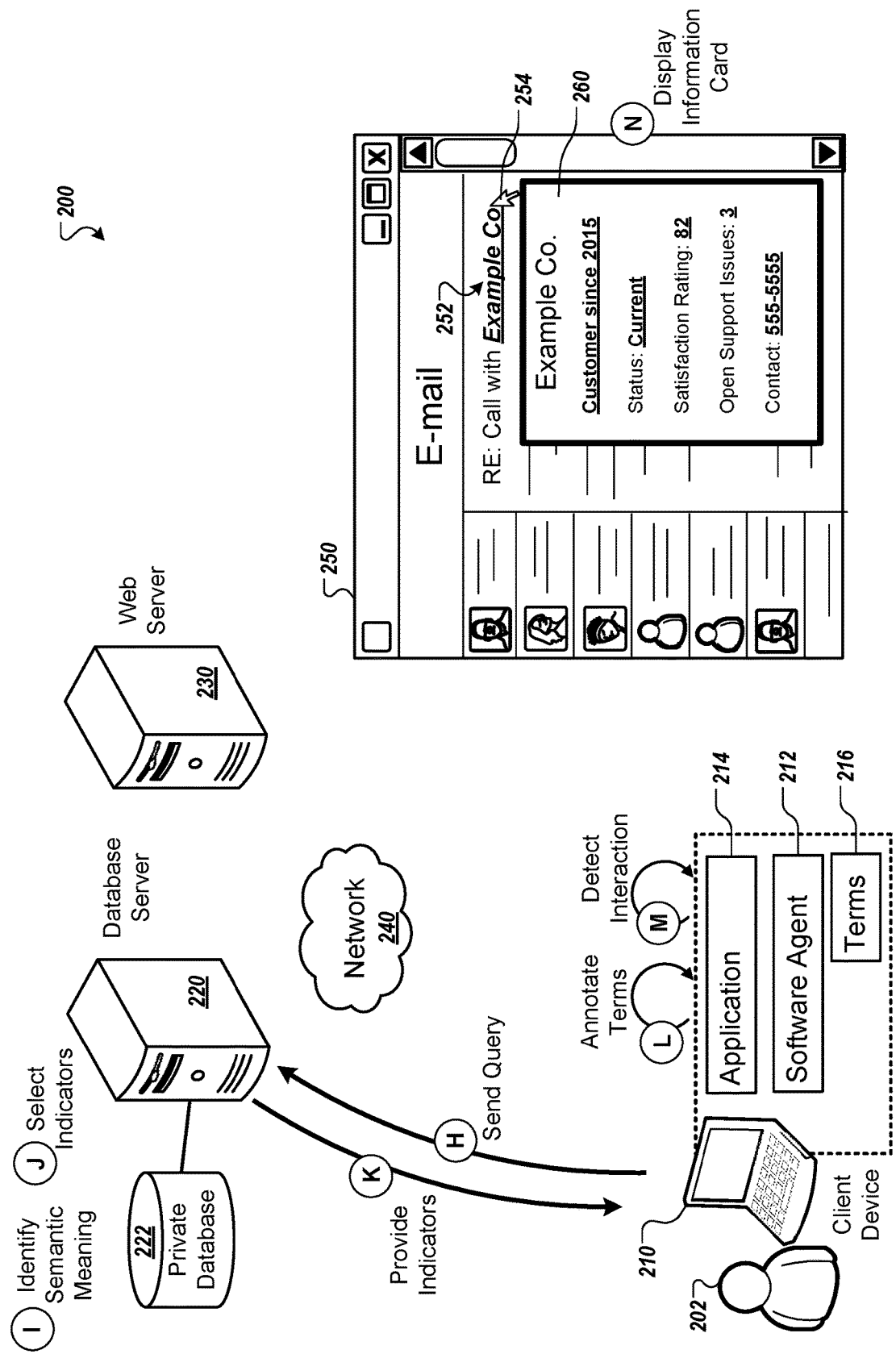

FIGS. 2A-2B are diagrams illustrating another example of a system 200 for inline delivery of database content. FIGS. 2A-2B illustrate various operations of the system 100 in greater detail. FIGS. 2A-2B illustrate various operations and flows of data represented as stages (A)-(N), which can be performed in the order shown or in a different order.

The system 200 includes a client device 210, a server 220, a web server 230, and a network 240. The server 220 has access to a private database 222 for an organization. The server 220 may be implemented using multiple computers that cooperate to perform the functions discussed below, and which may be located remotely from each other. The client device 210 includes an application 214 as well as a software agent 212 that enables the client device 210 to dynamically generate and display contextually-relevant information cards displayed inline with the application 214. As discussed below, the software agent 212 allows the client device 210 to obtain and provide information from the private database 222 with the application 214 and web page from the web server 230, even though the application 214 and web page are controlled by third parties.

In stage (A), the client device 210 obtains and displays content from the web server 230 in the user interface 250.

In stage (B), the user 202 authenticates to the software agent 212, e.g., a web browser extension or add-on for another type of application 114. For example, the software agent 212 may prompt the user 202 to log in, or the user may click an icon for the software agent 212 to initiate log in. The user can enter a username and password, or alternatively authenticate in another form, e.g., through biometric data entry, entry of a PIN code, etc.

In stage (C), the software agent 212 communicates with the server 220 to authenticate the user 202. The software agent 212 may optionally request updated information from the server 220, such as a set of terms 216 representing keywords relevant to the user 202 and an organization of the user 202.

In stage (D), the server 220 completes the authentication of the user 202. Once it is determined that the received credentials are valid and are authorize access to information from the private database 222, the server 220 obtains the current set of terms or keywords that are applicable for the user 202 and the user's organization. This can involve extracting information from the private database 222, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers can also be included. The terms may be filtered based on the access permissions of the user 202, the role of the user 202 (e.g., department, job title, responsibilities, etc.), and other factors.

In stage (E), the server 220 provides the terms to the client device 110 for storage and for use by the software agent 212. These terms can be set by an administrator for the system 200. In some implementations, the set of terms is generated by the server, for example, by pulling terms from a portions of a database or other data source. For example, the server 220 may access database tables that list entity names (e.g., for competitors, suppliers, partner organization, employees, customer contacts, etc.) as well as abbreviations and/or nicknames for them. Based on the identity and role of the user 202, the server 220 may filter the list, e.g., limiting the extracted set of terms to those having information determined to be relevant to the role of the user 202 and also those for which the user 202 has security permissions to access corresponding data. The set of terms may be further limited to terms for types of entities for which appropriate information card templates have been defined. The filtered list of terms can then be provided to the client device 210. The database may be queried dynamically each time to obtain an up-to-date set of key terms each time a new set of terms 216 is requested.

In some implementations, the user 202 may be able to customize the set of terms that are annotated and made interactive to be able to trigger display of an information card. For example, the software agent 212 may provide a user interface allowing a user 202 to edit the list of terms, e.g., to add or remove terms from the set that will be identified and annotated in the future. These changes can be customized for the specific user identity of the user 202 who is logged in and/or for the specific client device 210 used. The user interface may allow edits for individual terms, or for groups or categories of terms. This ability can allow a user to limit the terms that will be annotated to the set that the user is specifically interested in. Similarly, it can expand the set of terms to include terms that may not be directly related to the user's role but still relate to the user's interests.

The terms 216 can be terms other than proper names. For example, for an engineer, the terms 216 may additionally or alternatively may include component types, product names, or technical terms. Corresponding information cards may indicate a variety of types of information. For a component, a card might provide specifications, indicate suppliers, provide links to datasheets, identify products that use the component, etc.

In stage (F), the software agent 212 obtains user interface content from the application 214. For example, the software application 212 obtains text content from the user interface 250. This can include the entire content of the rendered page, document, or view, not only the portion that may be currently visible on screen (e.g., due to the current scrolling position).

In stage (G), the software agent 212 evaluates content of the user interface. For example, this can include comparing text from the user interface 250 with the terms 216 provided by the server 220 and stored at the client device 210, to identify matching terms that should be annotated and for which information cards may be generated.

In some implementations, the software agent 212 and/or the database server 220 may analyze text of the user interface 250 to identify or generate indicators to be displayed. Through analysis of the text of the UI, the software agent 212 and/or the database server 220 can, in real-time, produce indicators and other information on the fly, without the indicators being previously designed by a human author or administrator. For example, if the software agent detects there are multiple instance of an attribute combined with time and geographical dimensions, through interactions with the server 220, the software agent can produce specific aggregations of data for the indicated time and geography and present the information in an information card. To carry out this function, the server 220 can access a semantic graph to enable interpretation of content as it relates to a business or other entity, provide a summary, and link to more details, all of which can be produced dynamically. The semantic graph can indicate, for example, the attributes of an entity and may indicate where to locate data for the attributes from the private database 222.

As an example, from text in a web page, the software agent 212 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning identified by the software agent 212. From these additional terms, the software agent may compose one or more indicators to be requested from the database server 220. For example, the software agent 212 may generate a query that requests a number of subscribers from Example Co. were added in Florida from April to June of 2016. Similarly, the software agent 212 may generate a query requesting a total number of subscribers from the company for the same period and location. In addition, or as an alternative, the software agent 212 may provide the terms with semantic meanings to the database server 220, and the database server 220 can identify appropriate indicators from the terms.

Referring to FIG. 2B, in stage (H), the software agent 212 generates a query that indicates which terms 216 were identified in the user interface 250. The query can additionally include other contextual information, such as indications of time, geographical location, or topic that the software agent 212 identified in the content from the user interface 250. The software agent 212 causes the client device 210 to send the query to the server 220.

In stage (I), the server 220 identifies a semantic meaning for each identified term that the query indicates. As part of identifying a semantic meaning, the server 220 may select a semantic classification from among multiple predetermined semantic categories. The semantic meaning is generated using the information of the private database 222 and so can be specific to the user 202 and the organization of the user. For example, one company may be a supplier for one organization and a customer of another. Similarly, even within one organization, an individual may be the supervisor of one user but a peer of or may be supervised by a different user. Thus, the interpretation of the terms can vary based on the relationships indicated in the private database 222 and can vary from one organization to another, from one user to another, and over the course of time.

In stage (J), the server 220 selects indicators for each identified match to the terms 216. The server 220 also looks up or calculates values for each type of indicator selected. These indicators or types of values to show may be any of multiple types of values. For example, some indicators may be attributes or database field values retrieved directly from a database or other data source. As another example, indicators may be results of aggregation of data from one or more databases, or may be results of processing data with equations, formulas, functions, or models.

The server 220 may select the indicators to be provided using one or more templates that specify which indicators to use in information cards corresponding to different types of entities. For example, a template specifying a first set of indicators may be used for entities classified as suppliers, while a template specifying a different set of indicators may be used for entities classified as customers. As another example, companies, people, locations, and products may each have different templates or sets of indicators predefined, since each may have different attributes or characteristics of interest. Both of these can be used together also. For example, a first set of the indicators may be determined based one classification of an entity (e.g., person, place, object, . . . ) while a second set of the indicators may be determined based on a different classification for the entity (e.g., supplier, customer, competitor, etc.) The templates may indicate formatting and layout for information cards as well as the types of indicators that should be provided.

As noted above, for each matching term, the server 220 determines a semantic classification of the term, e.g., a category or classification of the term and/or identifying an entity that the term refers to (e.g., where the entity may be a particular person, company, object, etc.). The server 220 also accesses one or more records from the private database 222. The types of records accessed may vary based on the semantic classification. For example, when the term is a customer name, the data may indicate indicating attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 220 can have a number of potential indicators or types of data that can be provided. These indicators can take any appropriate form, such as text, numbers, icons, charts, graphs, images, etc. In some instances, the indicators can represent key performance indicators for an entity referenced by an identified term with respect to the specific organization of the user 202. For each matching term identified in the user interface 250, the server 220 selects a subset of the available indicator or data types to provide in the results 224. This subset can be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 220 can implement this is to have templates defined for each semantic classification, where the template indicates data types of indicators that are set to be provided for terms having that classification. Each indicator can have one or more references to data within the database, e.g., a column or field type of the private database 222 used to obtain or generate the indicator, as well as corresponding equations for generating the indicator and criteria such as threshold for evaluating the indicator.

In some implementations, at least some of the indicators are selected dynamically based on analysis of the contents of the private database 222. This process can be done to modify (e.g., filter and/or supplement) a base set of indicators pre-associated with a semantic classification or to generate the set of indicators directly. The indicators to be provided are selected from what is available or what can be calculated from the information in the private database 222 and optionally other data sources. From the available indicators, the server 220 can apply various thresholds to determine which indicators are most relevant. For example, if an indicator deviates from a historical average or range by more than a threshold amount, the indicator can be indicated selected. Similarly, if an indicator relates to a recent or upcoming event occurring within a threshold amount of time from the current time, the indicator can be selected. In general, each indicator can be assigned a score for each of multiple factors, the indicators can be ranked based on the scores, and the highest-scoring indicators can be selected to provide to the client device 210 in the results 224.

The indicators can also be customized based on the role of the user 202 in the organization. For example, the server 220 can look up a job title, department identifier, or other classification of the user 202, and also access data specifying indicators relevant to that classification. As an example, a user indicated in company records as a financial analysis may be provided financial metrics for a customer, while a user indicated as an engineer may be provided technical information about a product sold to the customer. The indicators selected can be further customized based on the historical interaction of the user 202. For example, based on records of interactions of the user 202 with prior information cards, the server 220 can determine which indicators are likely to be of interest to the user 202 for different types of entities.

The server 220 may use various other techniques to select indicators, including predefined indicators for specific classifications or specific entities, user interactions data for multiple users, user preferences of the user 202, prior behavior of the user 202, artificial intelligence or machine learning, analysis of trends, news and recent events, and so on.

In some implementations, the system tracks user interactions and learns from user behavior. For example, the system can monitor interactions with information cards and adapt the current information card or later-provided information cards in response. The system can track any of a variety of interaction parameters, such as how long an information card is displayed, how many times the information card is caused to be displayed, whether a user moves a cursor over a UI element (e.g., a mouseover), how long the cursor hovers over the UI element, whether a UI element is selected or copied to a clipboard, etc. Information cards can have interactive elements also, e.g., buttons, scrolling controls, drop-down lists, hyperlinks, sliders, dials, maps, embedded audio or video, and so on. These interactive elements may reveal additional indicators or allow a user to access additional content from the private database or other data sources. The system can track interactions with these interactive elements as well.

The system can customize the characteristics of information cards for users individually or based on aggregated information about interactions of multiple users. For example, according to the level of interaction that users have with indicators on the cards, the system can change which types of indicators are selected, as well as the prominence, arrangement, or number of indicators presented. If one user frequently hovers over, selects, or copies to a clipboard information from a certain type of indicator for entities of a certain classification, the system may generate future cards for that classification to show the indicator more prominently (e.g. larger or closer to the top of the card) and/or to include additional related indicators (e.g., showing the indicator with greater precision, or showing trends in the indicator over time, or showing other indicators of the same data type). As another example, if a user rarely interacts with certain types of indicators, those indicators may be made less prominent (e.g., smaller or lower in the card) or may be removed.

Tracking and adjustment of information cards can be done on a per-user basis, or for groups of users (e.g., users at similar roles or in the same department or organization), or across users generally. Similarly, tracking and adjustment can be done for certain classifications as a whole (e.g., across all entities or terms sharing a semantic classification), or tracking and adjustment may be done separately at the level of individual terms or entities. For example, two companies of the same semantic classification (e.g., both suppliers to an organization) may have different indicators shown in their information cards, or have a different arrangement of the indicators, due to different ways users interact with the respective cards.

The server 220 may apply security policies when selecting which types of indicators to use and when generating or providing values for the indicators to the client device 210. For example, security policies may limit access to certain databases or portions of databases, and the server 220 may determine whether the user 202 has sufficient access privileges before providing (or even simply retrieving or computing) values for that depend on data that the user 202 is not authorized to access. In some implementations, database information may secure information at the level of a table, column, and/or row. As a result, collections of records, individual records, or even individual fields or elements of records may have security policies applied. If the server 220 determines that the value of an indicator would depend on data that the user 202 is not authorized to access, the server 220 does not provide the indicator value. Instead, the server 220 may omit that indicator, substitute the indicator for one that the user 202 is authorized to obtain, or cause a placeholder value such as "n/a" or "---" to be provided to indicate that the value is not being provided.

In some implementations, the server 220 maintains associations or links between terms and different data records or data sources. For example, the server 220 may store data mapping terms to data cubes used for online analytical processing (OLAP). Selecting the types of indicators and determining the values for those indicators can involve using the mapping data to retrieve data from the data cubes (or other forms of data storage). Other mappings may also be used. For example, different terms may mapped to a unique identifier, which is then mapped to other records. For example, the terms "Example Company," "Example Co.," "EC," and other related terms may each map to a single entity identifier, which may then be used to retrieve information about the which indicators are relevant and what the values for those indicators should be.

In stage (K), the server 220 provides the values for the selected indicators for each identified term from the query to the client device 210. In the example, the selected indicators include a status of the "Example Co." company with respect to the organization of the user 202, a satisfaction rating indicating how satisfied the company appears to be as a client, a number of open support issues for "Example Co." and contact information for "Example Co." The server provides an indication of each of these indicator types, as well as a value corresponding to each indicator, e.g., a value of "current" for the status indicator, a value of "82" for the satisfaction rating indicator, a value of "3" for the number of support issues, and the phone number "555-5555" for the contact information indicator.

In stage (L), the software agent 212 cooperates with the application 214 to annotate the identified terms in the user interface 250. For example, the term 252 is annotated in FIG. 2B. This process causes the annotated terms to become interactive. For example, the software agent 212 can register with the application 214 to receive notification of interaction events, such as a mouseover event, click event, tap event, etc.

In some implementations, when the application 214 is a web browser, the software agent 212 can inject code, such as HTML code and/or JavaScript code, into the content of a web page being browsed to cause annotations to be shown. The injected code may also listen for and respond to events, such as a click, mouseover, tap, or other interaction with annotated terms. When the application 214 is not a web browser, the software agent 212 may use other techniques, such as macros or APIs to cause terms to be annotated and become interactive. In a similar manner that a web browser accepts toolbars and extension modules, the application 214 may provide extension components to integrate with other types of applications as well. More generally, the software agent may provide overlay content to be placed on, around, or over the place where the term occurs. This may optionally be done through communication with the operating system rather than integration with a specific application.

In stage (M), the software agent 212 detects interaction with one of the annotated terms. For example, the user 202 moves a cursor 254 over the annotated term 252. The software agent 212 may detect the interaction by being notified by code that was injected into a web page, such as event handling code that notifies the software agent 212 of the user action. Other techniques may additionally or alternatively be used. For example, the software agent 212 may monitor user input events generally, with information provided by the operating system, for example. The software agent 212 may track the on-screen position of each annotated term, as well as the position of a cursor or user input, and thus detect when the user has interacted with one of the annotated terms.

In stage (N), the software agent 212 causes the display of an information card 260, for example, as an overlay or pop-up over the original user interface 250. The information card can include the indicators selected by the server 220 and provided over the network. In some implementations, the information card 260 can be displayed near, e.g., adjacent to or even partially or completely overlapping the annotated term 252.

While various examples discuss annotating terms shown in a web page, the same techniques can be used to annotate and make interactive terms occurring anywhere in a user interface. Thus, terms in applications, documents, toolbars, controls, or any other part of a user interface can be annotated and made interactive to trigger display of an information card corresponding to the term.

As discussed above, the application can be a web browser, and the software agent can be a web browser extension. Nevertheless, the same techniques can be used to provide information cards for other types of applications and with other types of software agents. For example, a native application for word processing, spreadsheet editing, presentation editing, document viewing, etc. can provide an application programming interface (API) through which the content of the application can be provided to a software agent implemented as an application add-on module or extension. The software agent can integrate with or operate alongside a native application to identify keywords and dynamically display information cards as discussed herein.

Figure 3:
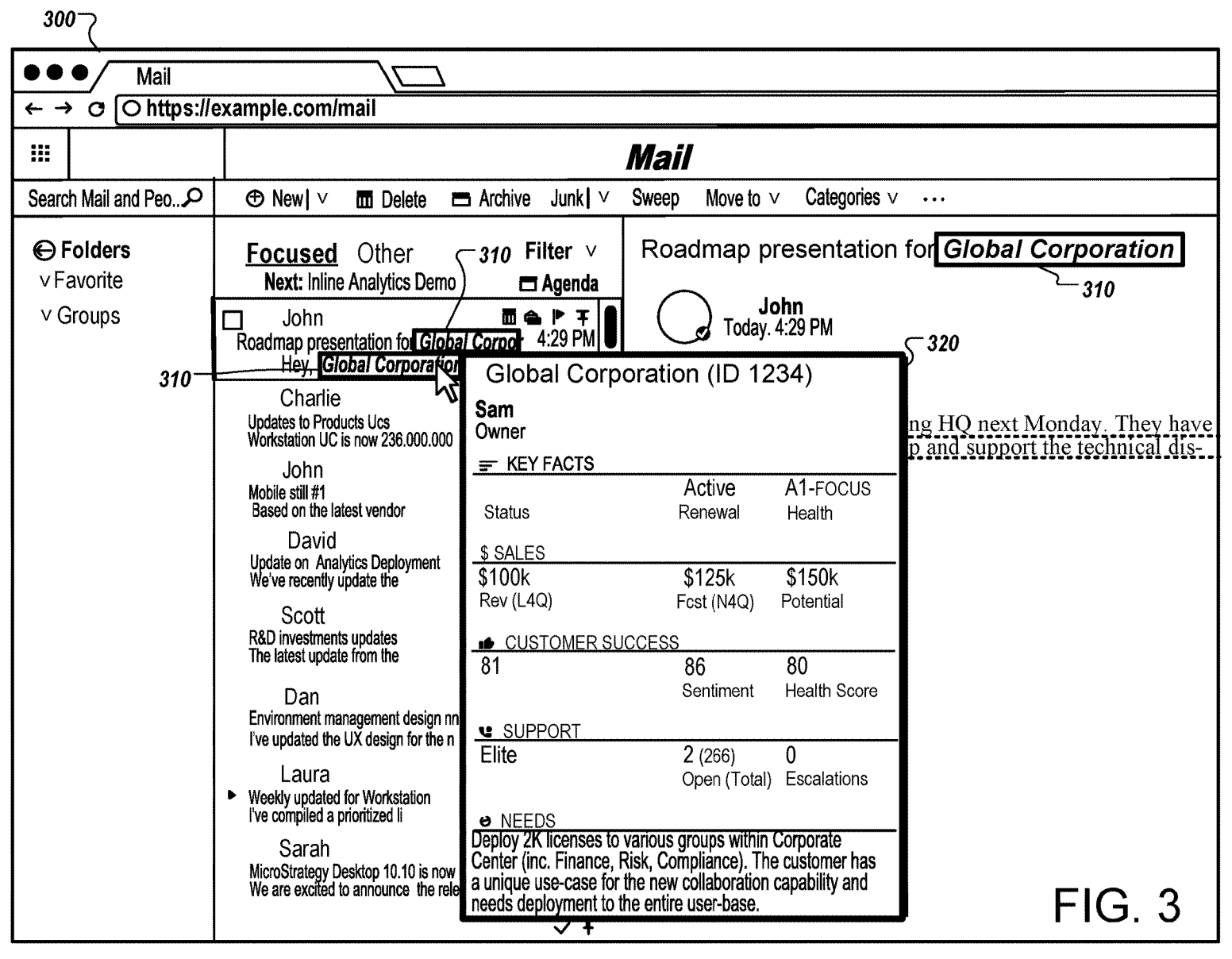

FIG. 3 is a diagram illustrating an example of a user interface 300 showing an information card provided in response to user interaction. In the example, the user interface 300 is one that may be provided by a client device, such as devices 110, 210 above. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 3, after navigating to the web page shown in the user interface 300, the system has determined that the phrase "Global Corporation" is matches an entry in a list of key phrases. In response, the client device annotates each instance 310 of this term in the user interface 300, shown here by bold and italic formatting and a box around the term. Other types of annotations can be additionally or alternatively used. Each instance of the key term is also made interactive.

When the user interacts with an instance 310 of the key term, the client device generates and provides an information card 320 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 3 seconds, 1 second, 0.5 seconds, etc.).

Figure 4A:
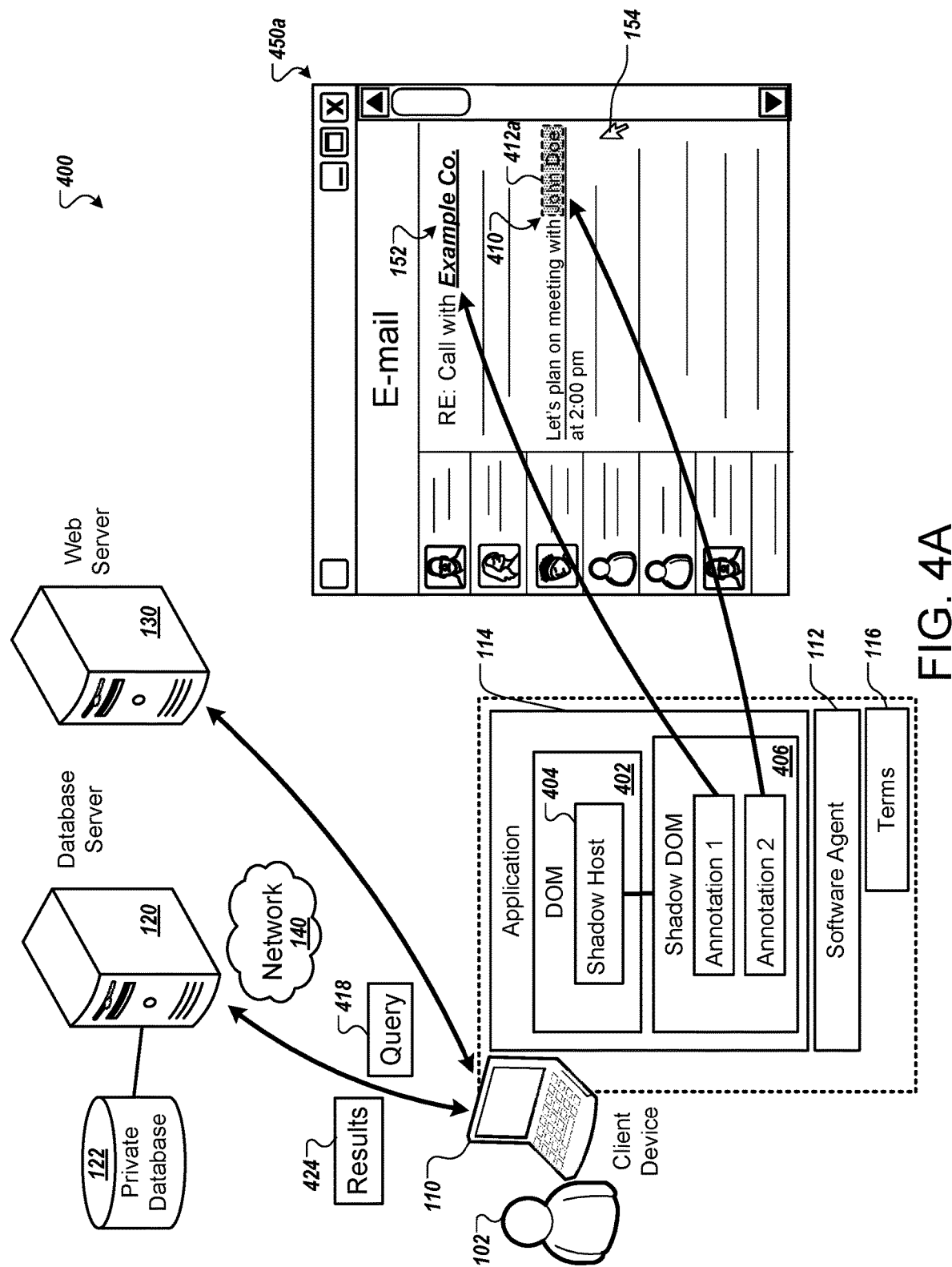
FIGS. 4A-4B are diagrams of an example of a system for the generation and presentation of dynamic document annotations.
Figure 4B:
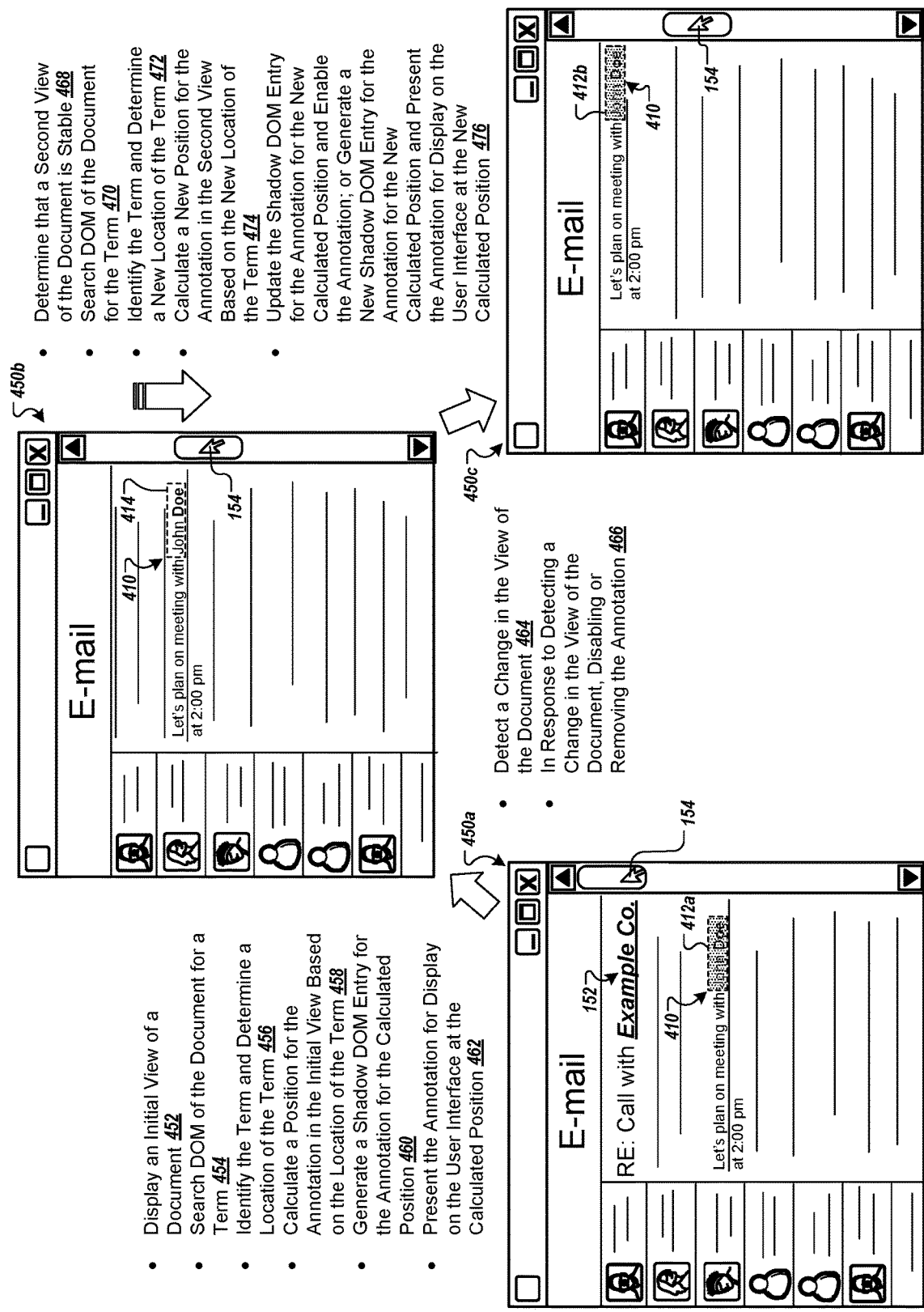

FIGS. 4A-4B are diagrams of an example of a system 400 for the generation and presentation of dynamic document annotations. In some implementations, the system 400 is the system 100 shown in FIG. 1.

As shown in FIG. 4A, the system 400 includes the client device 110, the server 120, the web server 130, and a network 140. The server 120 has access to the private database 122 for an organization. The server 120 may be implemented using multiple computers that cooperate to perform the functions discussed below, and which may be located remotely from each other. The client device 110 includes the application 114 as well as the software agent 112 that enables the client device 110 to dynamically generate and display annotations with the application 114. As discussed below, the software agent 112 allows the client device 110 to obtain and provide information from the private database 122 with the application 114 and web page from the web server 130, even though the application 114 and web page are controlled by third parties.

The software agent 112 may place generated annotations within a shadow DOM 406 of the application 114 by creating a shadow DOM 406 entry for the each of the annotations. The shadow DOM 406 entries may include a location such as a pixel location where each of the annotations are meant to be displayed in the user interface 450*a*. A DOM 402 of the application 114 may correspond to a web page that is displayed on a user interface 450*a*. The DOM 402 may include a shadow host 404. The shadow host 404 is a DOM node that is attached to the shadow DOM 406.

Web browser extensions generally annotate a document such as a web page by directly modifying the web page by hiding particular DOM nodes, or injecting additional DOM nodes such as iFrame elements or script elements into the web page. This approach can be inefficient, because each application or web page generally needs to be updated individually. Further, this type of embedding may not be possible when the content provider does not control the target application or web page for content to be embedded into. For example, an organization cannot change the standard e-mail application interface that a third party provides. Moreover, this type of embedding can lead to errors when attempting to present a web page due to, for example, conflicts occurring between the newly embedded elements and the DOM's existing elements.

In the system 400, instead of directly modifying the DOM 402 of a given web page, the software agent 112 (e.g., a browser extension for a web browser) may generate a shadow DOM 406 entry for an annotation. As a result of being in the shadow DOM 406, the annotation will not directly conflict with the elements of the DOM 402.

The disclosed techniques can also improve performance by reducing the processing power required to generate and provide annotations for display on a user interface. For example, the system 400 can reduce processing power by disabling or hiding a previously generated annotation when it detects an adjustment to the view of a document, and, later, enabling or unhiding the annotation when it detects that the adjustment has ended and providing the annotation for display at a new location on the user interface. These actions require significantly less processing power than, for example, the system 400 updating the location of the annotation multiple times during the adjustment of the view of the document.

The disclosed techniques can also improve user security and privacy by limiting the amount of browsing data that is recorded and uploaded. As will be discussed in more detail below, the searching of the terms and the dynamic annotation of those terms may be performed internally on a web browser, thereby significantly limiting the amount of potentially sensitive data that would be provided to remote systems.

In the example of FIG. 4A, the client device 110 communicates with the web server 130 to obtain and display a page of a web site or web application in the application 114. The client device 110 generates a user interface 450a for the application 114. Concurrently, the software agent 112 runs on the client device 110 and receives, from the application 114, the text content of the rendered page, e.g., user interface 450a.

As previously mentioned, the software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been granted to the user 102 by the organization.

With the user logged in, the software agent 112 accesses a set of terms 116, e.g., words and/or phrases, that are relevant to the user 102 and the organization. The set of terms 116 stored at the client device 110. In some implementations, the set of terms 116 is requested and received from the server 120 each time the user 102 authenticates. The set of terms can represent values from certain fields of the private database 122, for example, values representing names of customers of the company of the user 102. For example, the set of terms 116 may include a customer's name "John Doe." The set of terms 116 may also include the company's name "Example Co."

The software agent 112 compares the terms in the set of terms 116 with the text of the user interface 450a to identify matching terms. As will be discussed in more detail with respect to FIGS. 5A-5C, the software agent 112 may traverse the DOM tree of the web page presented on the user interface 450a when identifying matching terms. For example, the software agent 112 may determine that the user interface 450a contains the term "John Doe" and the term 152 ("Example Co.") that are also found in the set of terms 116. In identifying the matching terms, e.g., in traversing the DOM tree, the software agent 112 can leverage a matching algorithm. The matching algorithm can consist of one or more regular expressions, search trees (e.g., trie trees), and/or other data structures. For example, in identifying the matching terms, e.g., in traversing the DOM tree, the software agent 112 may use a set of expressions (e.g., regular expressions) developed from the set of terms 116. When the software agent 112 identifies one or more matches, it may obtain a position, e.g., a text position or screen position (e.g., pixel position) of the one or more matching terms in the user interface 450a.

In some implementations, when the software agent 112 identifies one or more matches, it generates a query 418 that indicates the matches and sends the query 418 to the server 120. In some implementations, the software agent 112 also examines the text of the user interface 450a to identify and include in the query 418 other contextual factors that may be of interest (which may be different from the terms 116 of interest), such as terms indicating a time or a geographical location indicated in the user interface 450a, or a task of the user 102 that may be indicated in the user interface 450a. Various words and phrases indicating an overall subject or topic of the user interface 450a may also be extracted and provided in the query 418.

In these implementations, the server 120 processes the query 418 and generates results 424 using the contents of the private database 122. These results 424 can indicate, for each identified matching term, various indicators (e.g., attributes, statistics, visualizations, text, or other content) relevant to the term. In some instances, the indicators can represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc. The client device 110 receives the results 424 from the server 120. The software agent 112 may then prepare the results 424 for display on the user interface 450a. In some implementations, the results 424 are not immediately displayed.

When the software agent 112 identifies one or more matches, it generates annotations for the instances of the identified matching terms in the user interface 450a. For example, the software agent 112 may instruct the application 114 to highlight the term or change the formatting of the term (e.g., color, font, size, bold, italics, underlining, etc.) in the user interface 150. For example, in response to identifying the term 152, the software agent 112 may instruct the application 114 to annotate the term 152 by displaying the term 152 as bold, underlined, and in italics. Similarly, in response to identifying the term 410 ("John Doe") in the user interface 450a, the software agent 112 may instruct the application 114 to provide an overlay 412a in the user interface 450a at the location of the term 410 so that overlay 412a covers the term 410.

In some implementations, an annotation such as an overlay is presented at a specific screen location that corresponds to a location of an identified matching term in the user interface 450a. The screen location may be pixel location of the user interface 450a. In generating an annotation, the software agent 112 may determine a screen location for the annotation.

The software agent 112 generate annotations, e.g., may make these highlights and/or formatting changes, by creating shadow DOM 406 entries (e.g., nodes) for each of the annotations. For example, the software agent 112 may generate a first entry ("Annotation 1") in the shadow DOM 406 for the term 152. Similarly, the software agent 112 may generate a second entry ("Annotation 2") in the shadow DOM 406 for the term 410. The information stored in the shadow DOM 406 for a given annotation may include the type of annotation (e.g., highlight, formatting changed, etc.), an indication of the matching terms, and/or a position (e.g., pixel location) where the annotation should be placed. The position of the annotation may be the same as, or based on, the position of the corresponding term in the user interface 450a that the software agent 112 obtained upon identifying the term in the user interface 450a.

In some implementations, in response to identifying the term 152 ("Example Co.") and the term 410 ("John Doe"), the software agent 112 makes the term 152 interactive and the overlay 412a interactive so that interaction of the user 102 with the respective term or annotation triggers display of an information card for that term. In this manner, when the user 102 indicates interest in one of the terms or annotations, e.g., by placing a mouse cursor 154 over the term or annotation, the software agent 112 is notified of the interaction and causes an information card with the indicators relevant to the term to be displayed. The information card can be displayed overlaying a portion of the original user interface 450a, for example, as a pop-up card near the instance of the term that the user 102 interacted with. The software agent 112 also detects when the user 102 is no longer interested in the information card and automatically removes (e.g., closes or hides) the information card in response. For example, when the user 102 moves the cursor away from the interactive term or annotation and/or away from the information card (or taps or clicks outside the interactive term and information card), the software agent 112 hides the information card.

As shown in FIG. 4B, an initial view of a document such as web page is presented in the user interface 450a. An adjustment to the view of the document may be made or initiated, for example, by the user 102. For example, the user 102 may adjust the view of a web page presented in the user interface 450a by scrolling through the web page, zooming in or out of the web page, opening a new window in the user interface 450a, opening a toolbar in the user interface 450a, selecting a link in the user interface 450a, selecting a toolbar element of a toolbar in the user interface 450a, changing the size of a window containing the web page, skipping a page of the web page, refreshing the web page, or the like. Here, the user 102 has adjusted the view of the web page displayed in the user interface 450a by using the cursor 154 to scroll through the web page.

The adjustment to the view of the document presented in the user interface 450a may correspond to an event that relates to the DOM of the document. For example, the adjustment to the view of the document may correspond to a right-click or context menu event, a drag event, a drop event, a fullscreen event, an open event, a wheel event, a resize event, a scroll event, a toggle event, among others.

The user interface 450b shows the document after the adjustment to the view of the document has started, resulting in a view of the document that is different than the initial view. Upon detecting the adjustment, the software agent 112 may disable, hide, or remove the overlay 412a. For example, the software agent 112 may disable or hide the overlay 412a by hiding the shadow DOM 406 node containing the overlay 412a. As another example, the software agent 112 may remove the overlay 412a by deleting the shadow DOM 406 node containing the overlay 412a.

An outline 414 is shown as an example of where the overlay 412a would be placed if it were not disabled or removed. As explained above, attempts to constantly update the location of the overlay 412a while the view of the document is being adjusted would require much more processing power and would, therefore, be far less efficient.

The software agent 112 may detect an adjustment to the view of the document by, for example, detecting one or more particular events that are part of the DOM 402. The particular events may be those events that are known to affect the view of the document.

The user interface 450c shows the document after the adjustment to the view of the document has ended. Upon detecting the end of the adjustment, the software agent 112 may again compare the terms in the set of terms 116 with the text of the user interface 450c to identify matching terms. For example, the software agent 112 may identify a matching term in the user interface 450c for the term 410 ("John Doe"), but at a new screen location.

Once the software agent 112 identifies a matching term, the software agent 112 may determine a location for the overlay 412b, and enable or unhide the overlay 412b and provide it at the determined location corresponding to the matching term. Here, the software agent 112 has provided the overlay 412b at a location corresponding to the term 410. As an example, the software agent 112 may enable or unhide the overlay 412b by unhiding the shadow DOM 406 node containing the overlay 412b that was previously hidden upon detection of the adjustment. Alternatively, the overlay 412b may be a new annotation generated by the software agent 112 and placed in the shadow DOM 406 upon the software agent 112 detecting the end of the adjustment.

The software agent 112 may detect the end of the adjustment by determining that no change to the view of the document has occurred within a threshold period of time. For example, the software agent 112 may determine that the adjustment has ended based on a failure to detect any events, e.g., that relate to the DOM 402, that would affect the view of the document for a threshold period of time (e.g., 3 seconds, 1 second, 0.5 seconds, etc.).

The software agent 112 may detect the end of the adjustment by detecting one or more particular events in the DOM 402. For example, the software agent 112 may detect the end of the adjustment by detecting a key-up event or a mouse-up event.

FIG. 4B also provides an example process for dynamically annotating the document presented in the user interface 450. This process may be performed by the system 100 or the system 400 described herein.

In this process, an initial view of a document is displayed in the user interface 450a (452). The DOM 402 of the document is searched for a term 410 (454). The term 410 is identified and a location of the term 410 is determined (456). A position for the overlay 412a is calculated in the initial view of the document provided in the user interface 450a based on the location of the term 410 (458). A shadow DOM 406 entry for the overlay 412a is generated for the calculated position (460). The overlay 412a is presented for display on the user interface 450a at the calculated position (462).

In this process, a change in the view of the document is detected (464). In response to detecting a change in the view of the document, the overlay 412a is disabled (e.g., by hiding the corresponding node or entry in the shadow DOM 406) or removed (e.g., by deleting the corresponding node or entry in the shadow DOM 406) (466).

In this process, it is determined that a second view of the document presented in the user interface 450c is stable (468). For example, this determination can made when the view of the document has not changed for at least a minimum threshold amount of time, such as 0.2 seconds, 0.5 seconds, 1 second, etc. The DOM 402 of the document is searched for the term 410 (470). The term 410 is identified in the user interface 450c and a new location of the term 410 is determined (472). A new position for the overlay 412b is calculated in the second view of the document based on the new location of the term 410 (474). If the overlay 412a was previously disabled or hidden, the shadow DOM 406 entry is updated for the overlay 412b for the new calculated position and the overlay 412b is enabled (e.g., unhidden) such that it is visible in the user interface 450c, overlaying the term 410. If the overlay 412a was previously removed, a new shadow DOM entry is generated for the overlay 412b for the new calculated position and the annotation is presented for display on the user interface 450c at the new calculated position FIGS. 5A-5C are diagrams pertaining to a document object model (DOM) tree 500 of a document.

In the example of FIG. 5A, a DOM tree 500 is shown having, for example, six nodes 502, 504, 506, 508, 510, and 512. The first node 502 is a document node that serves as the root for all the other nodes. The first node 502 has multiple child nodes 504, 506, and 512. The second child node 506 itself has two child nodes 508 and 510. The nodes 504, 506, 508, 510, and 512 may include one or more element nodes, text nodes, and/or comment nodes. The DOM tree 500 may be a tree of the DOM 402 shown in FIG. 4A.

As shown in FIG. 5B, each of the nodes 504, 506, and 512 corresponds with a different section of the document presented on the user interface 550. The node 506 includes the child node 508. The child node 508 includes plain text that reads "Let's plan on meeting with John." Whereas, the child node 510 includes bold text that reads "Doe." Despite being directly next to each other on the user interface 550, the two portions of text are rendered in different nodes due to the differences in formatting between them. For example, the text "Doe" in the node 510 is bold and, therefore, may appear within a bold tag of the document's HTML code while the text "Let's plan on meeting with John" is not bold and would not appear in that tag.

With respect to FIG. 4A, in identifying matching terms, the software agent 112 may compare the terms in the set of terms 116 with the text of the user interface 550. The software agent 112 may do this by consecutively searching the user interface 550 for each term in the set of terms 116, or may concurrently search the user interface 550 for multiple terms in the set of terms 116. In searching the user interface 550, the software agent 112 can use a data structure, such as for example a search tree (e.g., a trie tree) to perform the search. Alternatively or additionally, the software agent 112 can leverage a matching algorithm to search through the user interface 550. The matching algorithm can consist of one or more regular expressions, search trees (e.g., trie trees), and/or other data structures. For example, the software agent 112 can build a set of expressions (e.g., regular expressions) from the set of terms 116 to search through the user interface 550.

In searching through the user interface 550, the software agent 112 may systematically search through each of the different sections of the document presented on the user interface 550, e.g., may search through each of the nodes in the DOM tree 500 that are currently displayed in the user interface 550. As an example, for a given term, the software agent 112 may start by searching the node 504, followed by searching the node 506, followed by searching the node 508, followed by searching the node 510, and finally by searching the node 512.

In searching through the user interface 550, the software agent 112 may search the DOM tree 500 in a hierarchical order, starting with highest level nodes other than the first node 502, e.g., search the parent nodes before, potentially, searching the child nodes. As an example, for a given term, the software agent 112 may start by searching the node 504, followed by searching the node 512, followed by searching the node 506, followed by searching the node 510, and finally by searching the node 506.

In searching through the user interface 550, the software agent 112 may search the DOM tree 500 in a hierarchical order, starting with lowest level nodes, e.g., search the child nodes before, potentially, searching the parent nodes. As an example, for a given term, the software agent 112 may start by searching the node 508, followed by searching the node 510, followed by searching the node 506, followed by searching the node 504, and finally by searching the node 512.

Upon identifying a term in the user interface 550, the software agent 112 will obtain its position in the user interface 550, e.g., its text position or screen position (e.g., pixel location). As discussed in more detail above, the software agent 112 may use this position information in generating one or more annotations.

When a term being searched includes more than a single component, the software agent 112 may search through the user interface 550 for one or more of the components of the term. For example, if the term contains two words, e.g., "John Doe", the software agent 112 may search the DOM tree 500 for the component "John" and/or "Doe" using the techniques described above. The software agent 112 may obtain position information for any identified components, and may use the position information to identify a matching term by comparing the positions of two or more identified components with one another, e.g., to ensure that the components are next to one another.

When the software agent 112 identifies a matching component of a searched term in a node of the DOM tree 500, the software agent 112 may search any child nodes of the node, the parent node of the node, and/or any other child nodes of the node for the one or more other components of the searched term. For example, if the software agent 112 identifies the component "John" in the node 508, the software agent 112 may search the parent node 506 and/or the other child node 510 of the parent node 506 for the other component "Doe" of the searched term 410 ("John Doe"). Here, the software agent 112 would find the other component "Doe" in the node 510. Using the obtained positions for the two components and/or using the structure of the DOM tree 500, the software agent 112 may determine that the first identified component "John" is directly next to the second identified component "Doe." Based on this, the software agent 112 may identify the matching term 410 in the user interface 550.

Additionally or alternatively, when the software agent 112 identifies a matching component of a searched term in a node of the DOM tree 500, the software agent 112 may combine multiple nodes to search by, for example, extracting the text from any child nodes of the node, from the parent node of the node, and/or from any other child nodes while keeping the text in the order in which it is displayed on the user interface 550. The software agent 112 may then search the combined nodes, e.g., the extracted text, for the term. For example, if the software agent 112 identifies the component "John" in the node 508, the software agent 112 may combine the two child nodes 508 and 510 by extracting the text from both of those nodes. This would result in the software agent 112 obtaining the text "Let's plan on meeting with John Doe." The software agent 112 may then proceed to search the extracted text for the term "John Doe." In doing so, the software agent 112 would find the term 410 in the extracted text and, therefore, would identify the matching term 410 in the user interface 550.

In some implementations, the software agent 112 only searches through the user interface 550 for a component of a term after attempting to search through the user interface 550 for the complete term. For example, the software agent 112 may first attempt to search through the nodes of the DOM tree 500 for the term 410 before searching through the nodes of the DOM tree 500 for the component "John" when it fails to identify the term 410.

In some implementations, the software agent 112 only searches the HTML text displayed in the user interface 550, e.g., text inside text nodes of the DOM tree 500, and does not attempt to identify any text present in images or videos displayed on the user interface 550.

As shown in FIG. 5C, the client device 110 performs a search of the term 410 through the DOM tree 500. As described above, the client device 110 may search through the DOM tree 500 in a hierarchical or systematic manner. In searching through nodes of the DOM tree 500, the client device 110 may identify text present within the given node, may determine if the term or portion of the term matches the identified text, and/or, if a match or partial match occurs, may determine a location (e.g., a pixel location for the matching term or the matching portion).

Here, the client device 110 starts by searching node 504 (Node 2) for the term 410. In searching the node 504, the client device 110 is unable to identify any text (e.g., due to the node 504 only containing images) and determines no match. The client device 110 proceeds to search node 508 (Node 4). In searching the node 508, the client device 110 identifies the text "Let's plan on meeting with John" and determines no match. However, in some implementations, the client device 110 may determine that a partial match occurred due to the identified text containing a portion ("John") of the term 410. The client device 110 proceeds to search node 510 (Node 5). In searching the node 510, the client device 110 identifies the text "Doe" and determines no match. However, in some implementations, the client device 110 may determine that a partial match occurred due to the identified text containing a portion ("Doe") of the term 410. The client device 110 proceeds to search node 512 (Node 6). In searching the node 512, the client device 110 identifies the text "E-mail" and determines no match.

The client device 110 then starts to search a combination of two or more nodes. The combination of nodes chosen may be those nodes that are related. For example, the combination of nodes chosen may share a parent node, or may represent a parent-child relationship. Here, the client device 110 searches the nodes 508 and 510 together due to, for example, both nodes sharing a parent node 506. In searching the nodes 508 and 510 together, the client device 110 identifies the text "Let's plan on meeting with John Doe" and determines that there is a match since the identified text includes the term 410.

Figure 6:
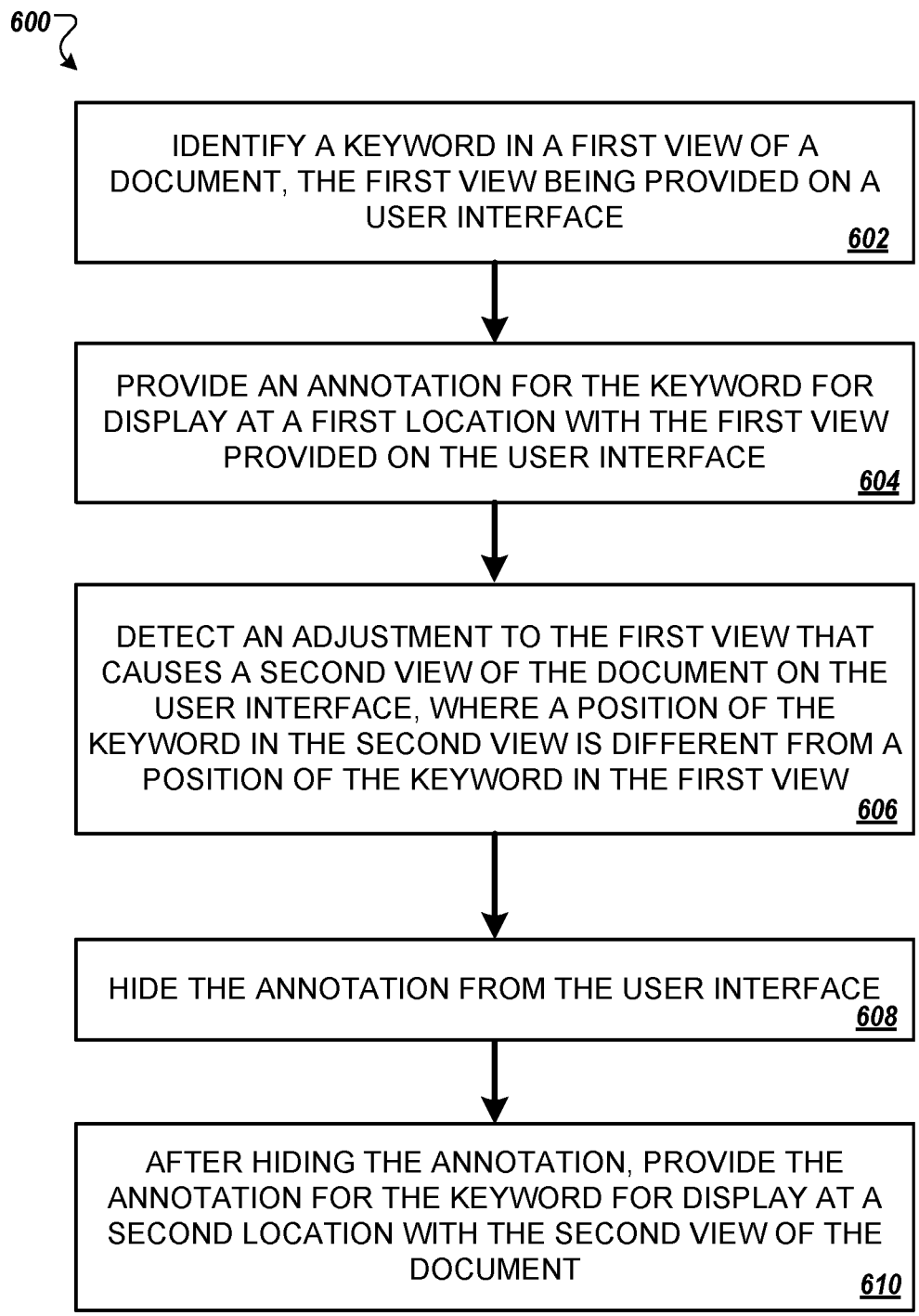
FIG. 6 is a flow diagram illustrating an example of a process for providing dynamic document annotations.

FIG. 6 is a flow diagram illustrating an example of a process 600 for providing document annotations. The process 600 can be performed by one or more computers, for example, using elements of the system 100 or the system 400 described above. Typically, the steps of the process are performed by a user device, such as a mobile phone, a laptop computer, a desktop computer, etc. For example, the process may be performed by the client device 110 or 210 discussed above.

The process 600 includes identifying a keyword in a first view of a document, the first view being provided on a user interface (602). With respect to FIG. 4B, the first view may be the view of the document displayed in the user interface 450a. The document can be represented by a Document Object Model (DOM).

The process 600 includes providing an annotation for the keyword for display at a first location with the first view provided on the user interface (604). With respect to FIGS. 4A-4B, the user interface may be the user interface 450a. The annotation may be provided by the software agent 112 or may be provided by the application 114 at the direction of the software agent 112. The annotation can be an element in the DOM. For example, the annotation may be represented as an element in a shadow DOM or a node of the DOM appended at the end of the DOM. The annotation can include at least one of an overlay, a border, an underline, an overline, a border, a strikethrough, a change to text font, a change to text size, capitalization of text, a removal of text capitalization, a change to letter spacing in text, an emboldening of text, or an italicization of text. Providing the annotation for the keyword for display at the first location can include causing the annotation for the keyword to be displayed at a first position on a screen. The location or position on the screen can be specified by pixel coordinates or in another form, such as relative to positions of other elements of content in the first view.

The process 600 includes detecting an adjustment to the first view that causes a second view of the document on the user interface (606). For example, a position of the keyword in the second view can be different from a position of the keyword in the first view. With respect to FIGS. 4A-4B, the adjustment may be caused by the user 102. The adjustment may cause a view of the document to change from the first view shown in the user interface 450a to a different, transitioning view shown in the user interface 450b.

Detecting the adjustment can be done by detecting an event that changes the DOM. Many other events or conditions can be detected as an adjustment to the first view. Detecting the adjustment can include detecting at least one of a scroll of the document, a resize of the document, a zoom of the document, a page skip in the document, a selection of a link in the document, an opening of a toolbar, a refresh of the document, or a selection of a toolbar element. Any other adjustment that triggers as change in the location, orientation, size, shape, or other presentation attribute of a term or element that is annotated can trigger the further steps of the process.

The process 600 includes hiding the annotation from the user interface (608). With respect to FIGS. 4A-4B, upon detecting that an adjustment has been made, the software agent 112 may hide, disable, or remove the overlay 412a annotation. Hiding the annotation from the user interface can include, for example, removing an element corresponding to the annotation from a DOM for the document, altering an annotation element in a DOM for the document to make the annotation invisible, or disabling the annotation.

In some implementations, hiding the annotation from the user interface is triggered by detecting a change in the DOM that alters the first view. Hiding the annotation from the user interface can include hiding the annotation from the user interface as the first view transitions to the second view.

The process 600 includes, after hiding the annotation, providing the annotation for the keyword for display at a second location with the second view of the document (610). With respect to FIGS. 4A-4B, the software agent 112 may change the location for the annotation and/or change other properties of the annotation (e.g., size, orientation, appearance, etc.) and then unhide, enable, or regenerate the overlay 412b annotation upon detecting that the adjustment has ended and determining that one or more matching terms are still present in the user interface 450c. The overlay 412b may be placed at a new location based on the new locations of the matching terms.

Providing the annotation for the keyword for display at the second location with the second view of the document can include causing the annotation for the keyword to be displayed at a second position on the screen. The location or position on the screen can be specified by pixel coordinates or in another form, such as relative to positions of other elements of content in the second view.

In some implementations, the DOM is used to identify the first location of the keyword in the first view of the document, and the DOM is used to identify the second location of the keyword in the second view of the document.

In some implementations, identifying a keyword in a first view of a document includes searching through one or more nodes of the DOM for the keyword and determining, based on the search, that the keyword is present in content of one or more nodes of the one or more nodes of the DOM.

Identifying a keyword (which is not limited to a single word, and so may be a phrase including multiple words) in a view of a document can include searching through one or more nodes of the DOM for a first portion of the keyword. The first portion of the keyword may be identified in a first node of the one or more nodes. A device can also search at least one of a child node of the first node, a parent node of the first node, or a child node of the parent node for a second portion of the keyword. The device can identify the second portion of the keyword (e.g., a second word in the phrase) in at least one of the child node of the first node, the parent node of the first node, or the child node of the parent node. Based on identifying the first portion of the keyword and the second portion of the keyword, even though corresponding to different DOM nodes, the device can determine that the keyword is present in the DOM. The annotation(s) that are applied for the keyword can cover both portions of the identified keyword, e.g., spanning portions of displayed content for both DOM nodes where the identified keyword is present.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   obtaining a document object model (DOM) for a web page or web application, the DOM including a set of DOM elements specifying document structure of the web page or web application, the set of DOM elements being determined from content of the web page or web application;
   identifying a keyword in a first view of the web page or web application, the first view being provided on a user interface;
   based on identifying the keyword, providing an annotation for the keyword for display at a first location of the user interface, wherein the annotation is displayed with the first view of the web page or web application on the user interface, wherein the annotation is provided using one or more additional DOM elements, used in addition to the set of DOM elements determined from the content of the web page or web application, to adjust presentation of the web page or web application;
   detecting an adjustment to the first view that causes the user interface to transition from the first view to a second view of the web page or web application on the user interface, wherein the adjustment moves the keyword from a first position in the first view to a second position in the second view, wherein the second position is different from the first position of the keyword in the first view; and
   in response to detecting that the adjustment to the first view has been initiated:
      hiding the annotation from the user interface such that, during at least a portion of the transition from the first view to the second view, the annotation is removed from the user interface while the keyword remains displayed in the user interface, wherein the annotation is hidden by altering the one or more additional DOM elements or removing the one or more additional DOM elements; and
      after hiding the annotation and after the second view is displayed on the user interface, providing the annotation for the keyword for display at a second location of the user interface with the second view of the web page or web application, wherein providing the annotation comprises updating the one or more additional DOM elements or generating one or more new DOM elements to provide the annotation for the keyword.

2. The method of claim 1, further comprising:
   determining that the adjustment has ended; and
   in response to determining that the adjustment has ended, identifying the keyword in the second view of the document before providing the annotation for the keyword for display at the second location with the second view of the document;
   wherein providing the annotation for the keyword for display at a second location is performed in response to determining that the adjustment has ended.

3. The method of claim 2, wherein determining that the adjustment has ended comprises determining that the second view has not changed for at least a predetermined minimum amount of time; and
   wherein, after the second view of the web page or web application is presented, presentation of the annotation for the keyword for the second view is delayed for at least the predetermined minimum amount of time.

4. The method of claim 1, wherein detecting the adjustment comprises detecting at least one of a scroll of the document, a resize of the document, a zoom of the document, a page skip in the document, a selection of a link in the document, an opening of a toolbar, a refresh of the document, or a selection of a toolbar element.

5. The method of claim 1, wherein detecting the adjustment comprises detecting an event that changes the DOM; and
   wherein hiding of the annotation from the user interface is triggered by detecting the event that changes the DOM.

6. The method of claim 1, wherein detecting the adjustment comprises detecting a change in the DOM that alters the first view; and wherein hiding of the annotation from the user interface is triggered by detecting the change in the DOM that alters the first view.

7. The method of claim 1, further comprising:
using the DOM to identify the first location of the keyword in the first view of the document; and
using the DOM to identify the second location of the keyword in the second view of the document.

8. The method of claim 1, wherein identifying the keyword in the first view of a document comprises:
searching through one or more nodes of the DOM for the keyword; and
based on searching through the one or more nodes, determining that the keyword is present in a particular node of the one or more nodes of the DOM;
wherein the first location for the annotation is based on the particular node in which the keyword is determined to be present.

9. The method of claim 1, wherein identifying the keyword in the first view of the document comprises:
searching through one or more nodes of the DOM for a first portion of the keyword;
identifying the first portion of the keyword in a first node of the one or more nodes;
searching at least one of a child node of the first node, a parent node of the first node, or a child node of the parent node for a second portion of the keyword;
identifying the second portion of the keyword in at least one of the child node of the first node, the parent node of the first node, or the child node of the parent node; and
based on identifying the first portion of the keyword and the second portion of the keyword, determining that the keyword is present in the DOM.

10. The method of claim 1, wherein providing the annotation for the keyword for display at the first location with the first view comprises causing the annotation for the keyword to be displayed at a first pixel location on a screen, wherein the one or more additional DOM elements specify coordinates for the first pixel location on the screen; and
wherein providing the annotation for the keyword for display at the second location with the second view comprises causing the annotation for the keyword to be displayed at a second pixel location on the screen, wherein the updated one or more additional DOM elements or the one or more new DOM elements specify coordinates for the second pixel location on the screen.

11. The method of claim 1, wherein the one or more additional DOM elements are added without altering the document structure of the web page or web application that is specified by the set of DOM elements determined from the content of the web page or web application.

12. The method of claim 1, wherein the DOM is generated by a web browser of a client device based at least in part based on markup language content of the web page or web application that is received by the client device over a communication network.

13. The method of claim 12, wherein the set of DOM elements comprises a DOM tree that indicates relationships among the DOM elements that are specified by the markup language content of the web page or web application received over the communication network; and
wherein providing the annotation for the keyword comprises adding the one or more additional DOM elements outside the DOM tree indicating the relationships among the DOM elements that are specified by the markup language content of the web page or web application.

14. The method of claim 1, wherein providing the annotation using the one or more additional DOM elements comprises:
generating the one or more additional DOM elements in response to identifying the keyword in the first view; and
appending the one or more additional DOM elements to an end of the DOM.

15. The method of claim 1, wherein providing the annotation using the one or more additional DOM elements comprises:
generating the one or more additional DOM elements in response to identifying the keyword in the first view; and
including the one or more additional DOM elements in a shadow document object model that is used with the DOM to provide the annotation on the first view of the web page or web application.

16. The method of claim 1, wherein the first location of the annotation is at a predetermined position with respect to the position of the keyword in the first view; and
wherein the second location of the annotation is at the predetermined position with respect to the position of the keyword in the second view.

17. The method of claim 1, wherein the adjustment to the first view comprises scrolling or resizing of the user interface by a user to change which portion of the web page or web application is visible on the user interface;
wherein hiding the annotation comprises hiding the annotation for the keyword in response to scrolling or resizing of the user interface; and
wherein providing the annotation of the keyword for display at the second location is performed in response to determining that scrolling or resizing of the user interface has ended.

18. The method of claim 1, wherein the content of the web page or web application specifies positioning of the keyword relative to other portions of the web page or web application; and
wherein, in the first view, during the transition from the first view to the second view, and in the second view, the keyword is positioned relative to the other portions of the web page or web application as specified by the content of the web page or web application.

19. The method of claim 1, wherein the adjustment shifts a location of the keyword on the user interface while the keyword remains in the user interface consistently positioned relative to adjacent content of the web page or web application as specified by the content of the web page or web application.

20. The method of claim 1, wherein the adjustment to the first view is an adjustment that changes which portion of the web page or web application that is shown on the user interface without editing the web page or web application.

21. The method of claim 1, further comprising, in response to detecting that the adjustment to the first view has been initiated and after hiding the annotation from the user interface:
maintaining the annotation hidden from the user interface while an intermediate view of the web page or web application is shown on the user interface during the transition from the first view to the second view, wherein the keyword is presented in the intermediate view at an intermediate position that is different from the first position and the second position, and wherein the keyword is presented in the intermediate view without the annotation.

22. A system comprising:

one or more computers; and one or more computer-readable media storing instructions that, when executed, cause the one or more computers to perform operations comprising:

obtaining a document object model (DOM) for a web page or web application, the DOM including a set of DOM elements specifying document structure of the web page or web application, the set of DOM elements being determined from content of the web page or web application;

identifying a keyword in a first view of the web page or web application, the first view being provided on a user interface;

based on identifying the keyword, providing an annotation for the keyword for display at a first location of the user interface, wherein the annotation is displayed with the first view of the web page or web application on the user interface, wherein the annotation is provided using one or more additional DOM elements, used in addition to the set of DOM elements determined from the content of the web page or web application, to adjust presentation of the web page or web application;

detecting an adjustment to the first view that causes the user interface to transition from the first view to a second view of the web page or web application on the user interface, wherein the adjustment moves the keyword from a first position in the first view to a second position in the second view, wherein the second position is different from the first position of the keyword in the first view; and in response to detecting that the adjustment to the first view has been initiated:

hiding the annotation from the user interface such that, during at least a portion of the transition from the first view to the second view, the annotation is removed from the user interface while the keyword remains displayed in the user interface, wherein the annotation is hidden by altering the one or more additional DOM elements or removing the one or more additional DOM elements; and after hiding the annotation and after the second view is displayed on the user interface, providing the annotation for the keyword for display at a second location of the user interface with the second view of the web page or web application, wherein providing the annotation comprises updating the one or more additional DOM elements or generating one or more new DOM elements to provide the annotation for the keyword.

23. One or more non-transitory computer-readable media storing instructions that, when executed by one or more computers, cause the one or more computers to perform operations comprising:

obtaining a document object model (DOM) for a web page or web application, the DOM including a set of DOM elements specifying document structure of the web page or web application, the set of DOM elements being determined from content of the web page or web application;

identifying a keyword in a first view of the web page or web application, the first view being provided on a user interface;

based on identifying the keyword, providing an annotation for the keyword for display at a first location of the user interface, wherein the annotation is displayed with the first view of the web page or web application on the user interface, wherein the annotation is provided using one or more additional DOM elements, used in addition to the set of DOM elements determined from the content of the web page or web application, to adjust presentation of the web page or web application;

detecting an adjustment to the first view that causes the user interface to transition from the first view to a second view of the web page or web application on the user interface, wherein the adjustment moves the keyword from a first position in the first view to a second position in the second view, wherein the second position is different from the first position of the keyword in the first view; and in response to detecting that the adjustment to the first view has been initiated:

hiding the annotation from the user interface such that, during at least a portion of the transition from the first view to the second view, the annotation is removed from the user interface while the keyword remains displayed in the user interface, wherein the annotation is hidden by altering the one or more additional DOM elements or removing the one or more additional DOM elements; and after hiding the annotation and after the second view is displayed on the user interface, providing the annotation for the keyword for display at a second location of the user interface with the second view of the web page or web application, wherein providing the annotation comprises updating the one or more additional DOM elements or generating one or more new DOM elements to provide the annotation for the keyword.

\* \* \* \* \*